United States Patent
Raghavan et al.

(10) Patent No.: US 12,294,424 B2
(45) Date of Patent: May 6, 2025

(54) TRANSMISSION CONFIGURATION INDICATOR (TCI) STATE INDICATIONS FOR TILTED ANTENNA ARRAYS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Yu-Chin Ou, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 533 days.

(21) Appl. No.: 17/824,525

(22) Filed: May 25, 2022

(65) Prior Publication Data

US 2023/0387967 A1 Nov. 30, 2023

(51) Int. Cl.
*H04B 7/0404* (2017.01)
*H01Q 21/00* (2006.01)
*H04W 16/28* (2009.01)
*H04W 72/0453* (2023.01)

(52) U.S. Cl.
CPC ....... *H04B 7/0404* (2013.01); *H01Q 21/0025* (2013.01); *H04W 16/28* (2013.01); *H04W 72/0453* (2013.01)

(58) Field of Classification Search
CPC .... H04B 7/0404; H01Q 21/0025; H01Q 1/24; H01Q 3/02; H01Q 21/28; H04W 16/28; H04W 72/0453
USPC .......................................... 370/310, 328, 329
See application file for complete search history.

(56) References Cited

U.S. PATENT DOCUMENTS

| | | | |
|---|---|---|---|
| 2020/0195310 A1* | 6/2020 | Abedini | H04B 7/026 |
| 2021/0152418 A1* | 5/2021 | Abdelghaffar | H04B 7/0602 |
| 2021/0168714 A1* | 6/2021 | Guan | H04W 52/16 |

* cited by examiner

*Primary Examiner* — Obaidul Huq
(74) *Attorney, Agent, or Firm* — Loza & Loza, LLP

(57) ABSTRACT

A device includes at least a first and a second antenna array module. The first antenna array module serves a first frequency band, the first antenna array module having a first antenna array surface that is substantially perpendicular to a first boresight and oriented substantially parallel to a first surface of the device adjacent to the first antenna array module, the second antenna array module serves a second frequency band, the second antenna array module having a second antenna array surface that is substantially perpendicular to a second boresight and oriented at an angle relative to a second surface of the wireless communication device adjacent to the second antenna array module, and the device transmits an indication of a set of transmission configuration indicator (TCI) states for use in the first frequency band and the second frequency band, the set of TCI states being selected based on the angle.

30 Claims, 11 Drawing Sheets

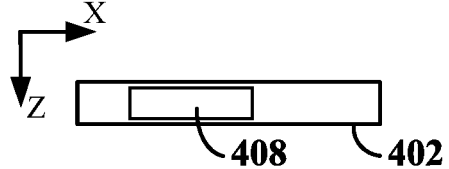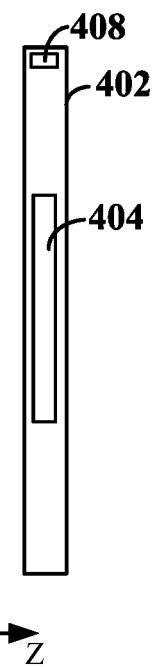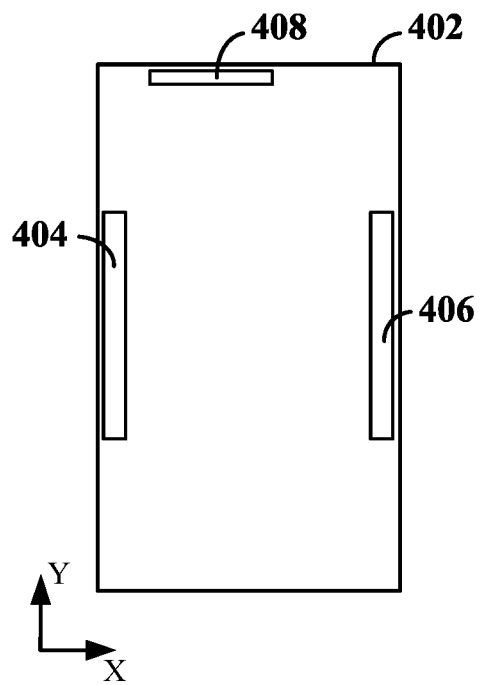
FIG. 4B
FIG. 4C
FIG. 4A

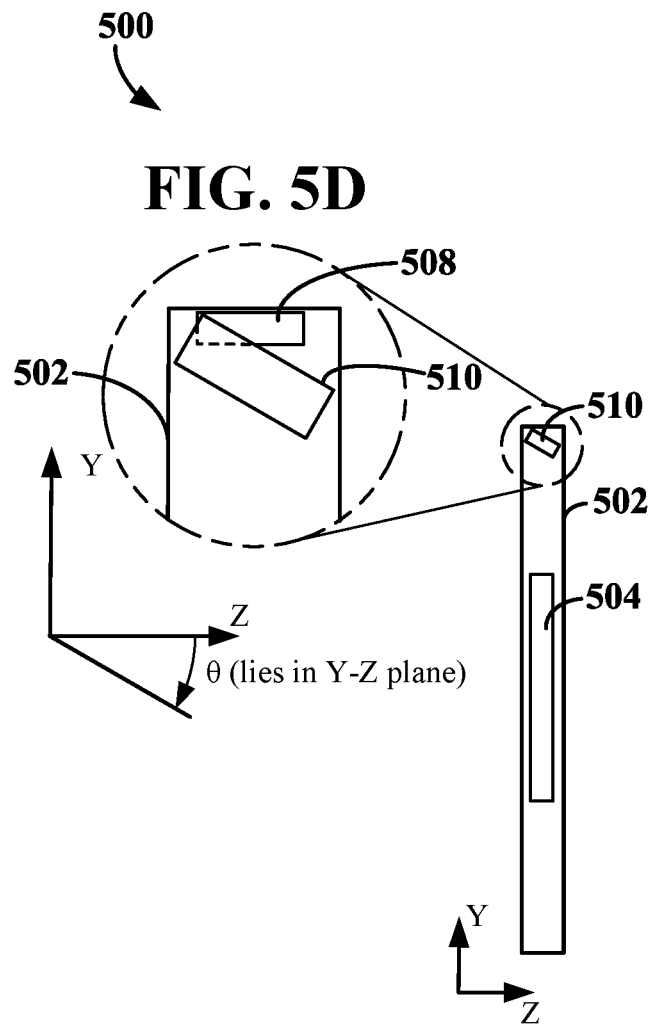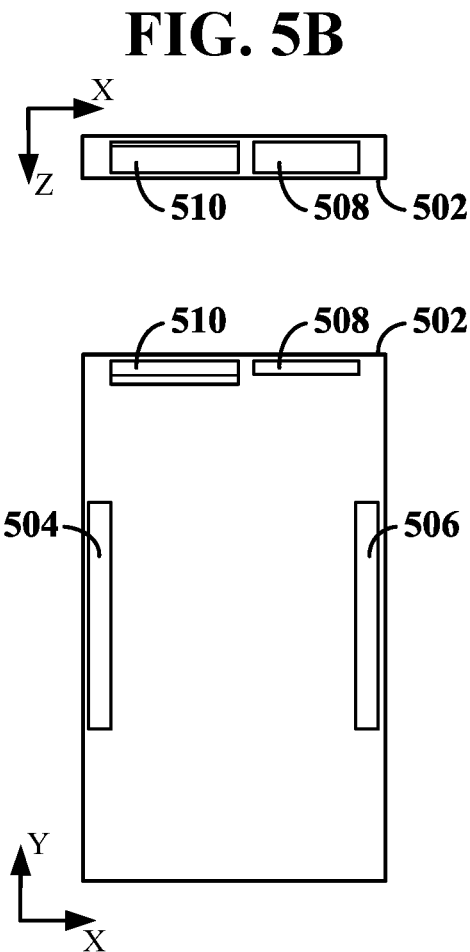

TRANSMISSION CONFIGURATION INDICATOR (TCI) STATE INDICATIONS FOR TILTED ANTENNA ARRAYS

TECHNICAL FIELD

The technology discussed below relates generally to wireless communication devices in a wireless communication network, and more particularly to a wireless communication device's provisioning of transmission configuration indicator (TCI) state indications for tilted antenna arrays utilized at the wireless communication device.

INTRODUCTION

Both a base station (e.g., a network entity, a network access node) and a wireless communication device (e.g., a user equipment, a mobile device) may utilize beam forming to maintain the quality of wireless communication with each other. Both the base station and the wireless communication device may switch beams for various reasons, including a change in radio conditions over time and/or a change in the location of the wireless communication device relative to the base station. Beam switching operations may involve the use of Transmission Configuration Indicator (TCI) states, which may identify quasi-co-location (QCL) relationships between various downlink channels and reference signals. Use of QCL relationships may add efficiency to beam selection operations, as, for example, identification of QCL relationships between downlink channels reduces a need for some measurements on uplink channels when beam correspondence conditions hold. Multiple antenna arrays may be co-located (e.g., located on a same edge or adjacent edges) at the wireless communication device. Each antenna array may be configured to operate in a different frequency band. Channel characteristics, which may be considered in establishing QCL relationships, may be different for co-located antenna arrays configured to operate in the different frequency bands.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a wireless communication device is disclosed. The wireless communication device includes one or more transceivers, a plurality of antenna array modules including a first antenna array module and a second antenna array module, each of the plurality of antenna array modules coupled to at least one of the one or more transceivers, a memory, and a processor coupled to the one or more transceivers, the plurality of antenna array modules, and the memory. In the example, the processor and the memory are configured to: utilize the first antenna array module to serve a first frequency band, the first antenna array module having a first antenna array surface that is substantially perpendicular to a first boresight and oriented substantially parallel to a first surface of the wireless communication device adjacent to the first antenna array module, utilize the second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module, and transmit an indication of a set of transmission configuration indicator (TCI) states for use in the first frequency band and the second frequency band, the set of TCI states being selected based on the angle.

In another example, a method at a wireless communication device is disclosed. The method includes utilizing a first antenna array module to serve a first frequency band, the first antenna array module having a first antenna array surface that is substantially perpendicular to a first boresight and oriented substantially parallel to a first surface of the wireless communication device adjacent to the first antenna array module; utilizing a second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module; and transmitting an indication of a set of transmission configuration indicator (TCI) states for use in the first frequency band and the second frequency band, the set of TCI states being selected based on the angle.

In another example, a wireless communication device, is also disclosed. In the example, the wireless communication device includes: means for utilizing a first antenna array module to serve a first frequency band, the first antenna array module having a first antenna array surface that is substantially perpendicular to a first boresight and oriented substantially parallel to a first surface of the wireless communication device adjacent to the first antenna array module; means utilizing a second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module; and means for transmitting an indication of a set of transmission configuration indicator (TCI) states for use in the first frequency band and the second frequency band, the set of TCI states being selected based on the angle.

In another example, a non-transitory computer readable medium is disclosed. The non-transitory computer-readable medium stores instructions that when executed by a processing circuit cause the processing circuit to: utilize the first antenna array module to serve a first frequency band, the first antenna array module having a first antenna array surface that is substantially perpendicular to a first boresight and oriented substantially parallel to a first surface of a wireless communication device adjacent to the first antenna array module, utilize the second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module, and transmit an indication of a set of transmission configuration indicator (TCI) states for use in the first frequency band and the second frequency band, the set of TCI states being selected based on the angle.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIGS. 4A, 4B, and 4C are schematic drawings illustrating a front view, top view, and left side view, respectively, of a wireless communication device according to some aspects of the disclosure.

FIGS. 5A, 5B, 5C, and 5D are schematic drawings illustrating a front view, top view, a left side view, and a partial view, respectively, of a wireless communication device according to some aspects of the disclosure.

DETAILED DESCRIPTION

Figure 1:
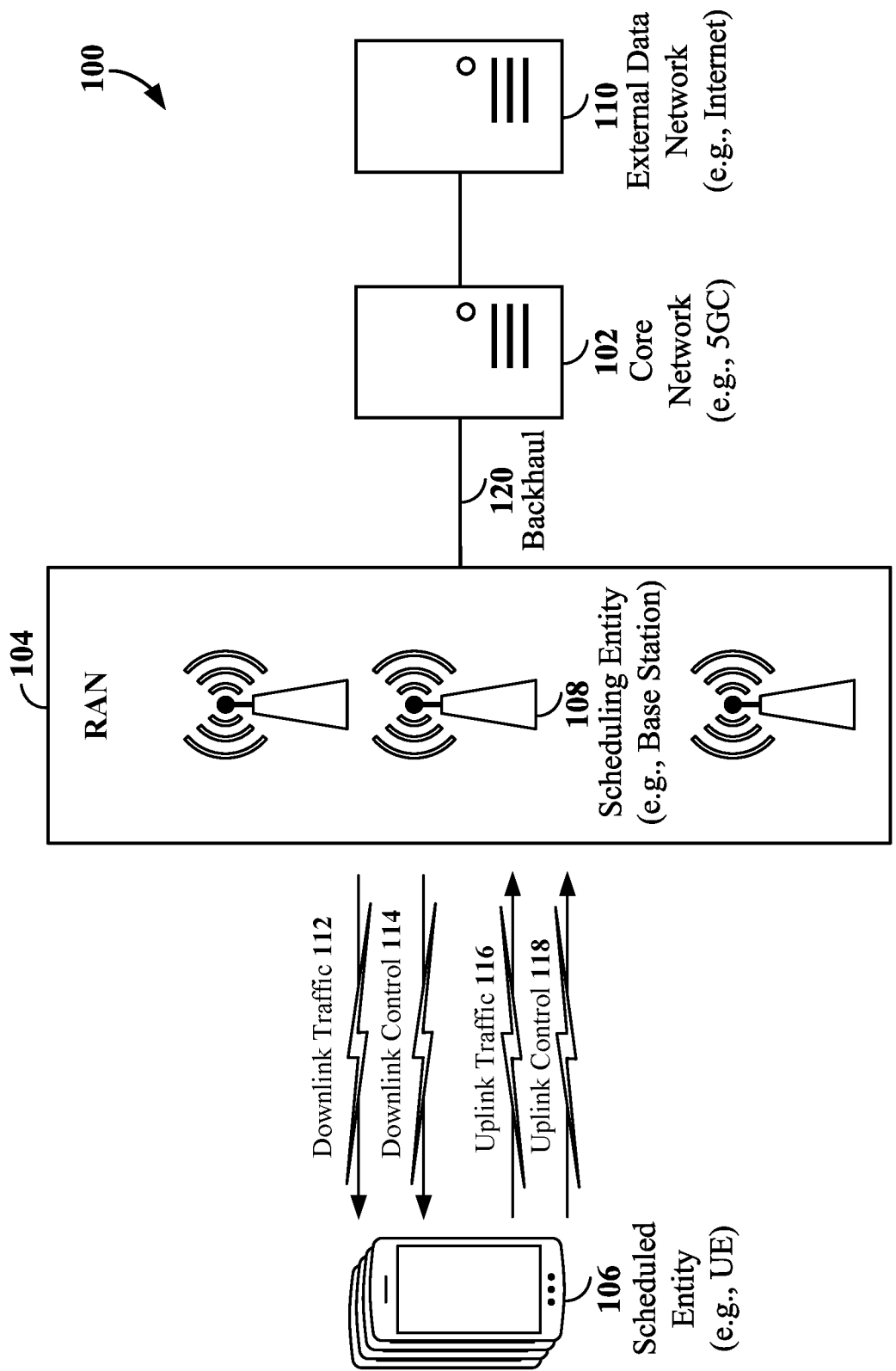
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some examples, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or user equipment (UE)), end-user devices, etc. of varying sizes, shapes, and constitution.

Described herein are methods and apparatus directed toward a use, in a user equipment, of at least a pair of antenna array modules configured to respectively serve a first and a second frequency band, where a first antenna array module serving the first frequency band may be oriented at an angle relative to the second antenna array module serving the second frequency band. The angular relationship between the first and second antenna array modules may inform the user equipment regarding differences in gain between the first and second antenna arrays with respect to a given direction relative a housing of the user equipment. Knowledge of the angle between the main lobes of the first antenna array module and the second antenna array module may facilitate obtaining and transmitting an indication of a set of transmission configuration indicator (TCI) states for use in the first frequency band and the second frequency band. The set of TCI states may be selected based on the angle between the main lobes of the first antenna array module and the second antenna array module.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF-chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink control information 118 and/or downlink control information 114 and/or uplink traffic 116 and/or downlink traffic 112 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per subcarrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base station 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5G core (5GC)). In other examples, the core network 102 may be configured according to a 4G evolved packet core (EPC), or any other suitable standard or configuration.

Figure 2:
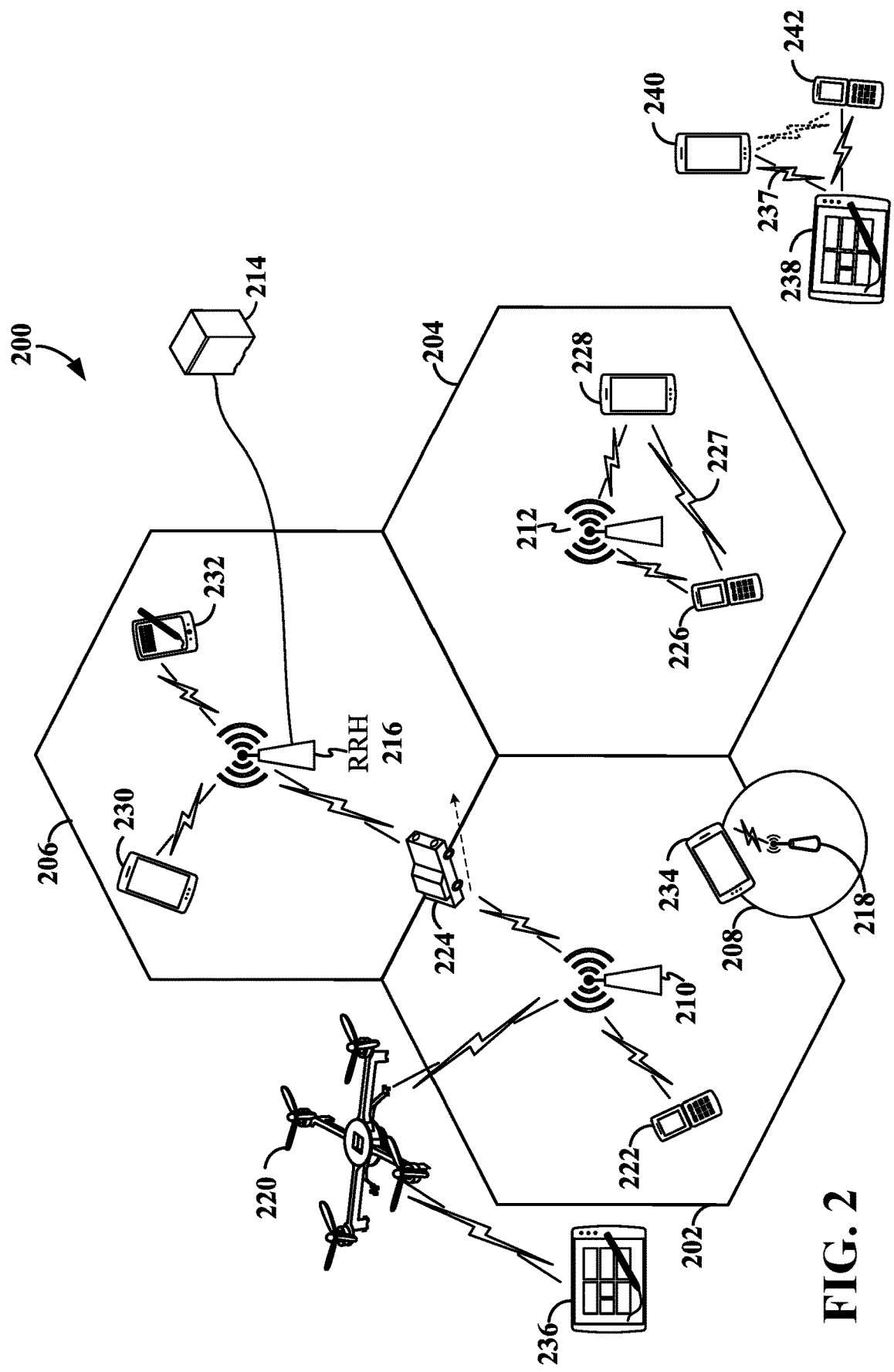
FIG. 2 is a schematic illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242)

may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into the mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 3:
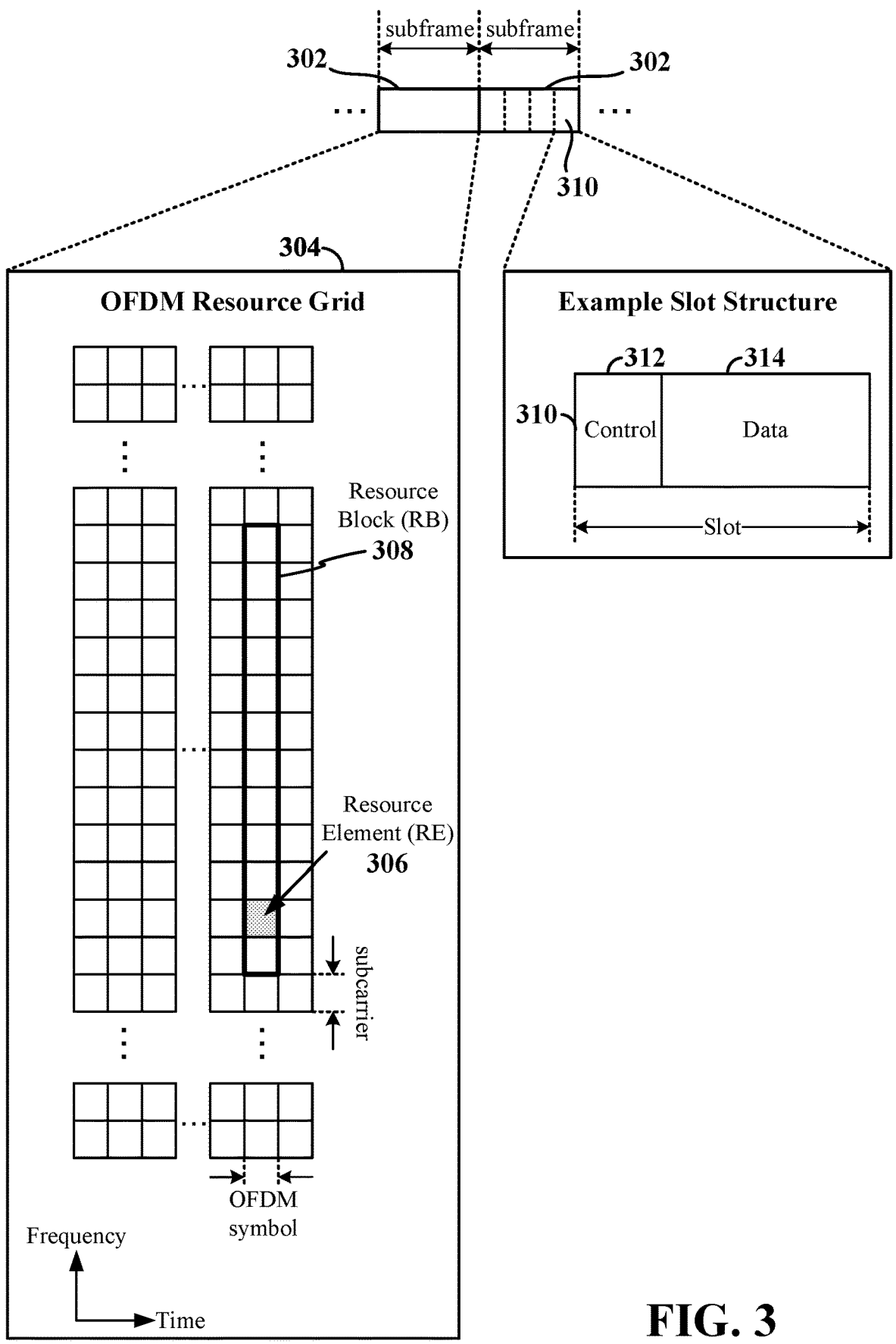
FIG. 3 is an expanded view of an exemplary subframe, showing an orthogonal frequency divisional multiplexing (OFDM) resource grid according to some aspects of the disclosure.

Referring now to FIG. 3, an expanded view of an exemplary subframe 302 is illustrated, showing an OFDM resource grid according to some aspects of the disclosure. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB 1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data. Such data may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information (e.g., a quantity of the bits of information), may be a controlled parameter, based on the modulation and coding scheme (MCS) and the number of RBs in a given transmission.

The channels or carriers illustrated in FIGS. 1, 2, and 3 are not necessarily all of the channels or carriers that may be utilized between devices, and those of ordinary skill in the art will recognize that other channels or carriers may be utilized in addition to those illustrated, such as other traffic, control, and feedback channels.

In 5G NR, multiple antennas are used at the base station (e.g., network node, network access node, gNB) and at the wireless communication device (e.g., UE, mobile device). With respect to the wireless communication device, the antennas may be oriented as multi-element dual-polarized antenna arrays. The antenna arrays may be packaged in antenna array modules. In one example, an FR2 (mm Wave) antenna array module may be as wide as a cellular phone is deep, thus allowing the FR2 antenna array module to be oriented parallel to a thin edge of the cellular phone.

The range of a wireless communication device may be limited at mm Wave frequencies, where atmospheric absorption may attenuate the radio waves, reducing the link budget. The link budget may be understood as being a summation of all of the power gains and losses that a communication signal experiences in a telecommunication system; from a transmitter, through a communication medium such as mm Waves, to the receiver. Other reductions to the link budget may be attributable to a characteristic of mm Waves, which is that such waves tend to reflect off objects rather than pass through them. Beamforming from the multiple antennas in the mm Wave antenna array modules may help to bridge the link budget at mm Wave frequencies. Beamforming may provide for a directional beam with higher gain than may be achieved using a single antenna or using a non-steerable antenna array that may be designed to have a wide beamwidth. Beamforming at the wireless communication device's side allows the wireless communication device to steer the peak gain of an antenna lobe formed using the mm Wave antenna array toward the base station (thus maximizing the gain of both transmitted and received mm Wave user traffic and control information).

According to some aspects, multiple antenna arrays (sometimes referred to as panels), where each antenna array includes a set of antenna elements that can be co-phased, may be included within antenna array modules. Multiple FR2 antenna array modules, in particular, may be positioned along the edges of the wireless communication device. The use of multiple antenna array modules may provide for an ability to meet spherical coverage requirements corresponding to expected effective isotropic radiated power (EIRP) specifications with and/or without hand and/or body blockage. The use of multiple antenna array modules may add to the overall capability (e.g., strength, robustness) of the wireless communication device by facilitating the use of beam switching over these antenna array modules, for example.

Designing, standardizing, testing, and evaluating wireless communication using the mid-band frequencies (FR3, 7.125 GHz-24.25 GHz) is ongoing. FR3 is anticipated to provide wide area coverage in upcoming "6G" wireless communication networks. Of course, based on their operating frequencies, the wavelength of radio waves in FR3 is larger than that of radio waves in FR2, but smaller than the wavelength of radio waves in FR1.

Current antenna design for wireless communication devices necessitates separate designs of antennas for FR1 and antennas for FR2. For frequencies closer to FR1, discrete/pseudo-omni antennas may be considered. For frequencies closer to FR2, antenna modules with multi-element antenna arrays may be considered. Likewise, antenna modules with multi-element antenna arrays may be considered for FR3 (i.e., the mid-band frequencies between FR1 and FR2). However, antenna arrays configured for use in the FR3 band may not be placed such that an antenna array surface (e.g., a face of the antenna array) lies parallel to an edge (e.g., the top, bottom, left, and right sides of a wireless communication device, the sides having the smallest dimension (i.e., depth) among the three dimensions (length, width, and depth)) of the wireless communication device. This constraint is due to the wavelength of the radio waves in FR3, and in particular to the interaction that antennas, configured for FR3, would have with the materials perpendicular to the faces of the antenna arrays, if the FR3 antenna arrays were placed parallel to the short edges (i.e., perpendicular to the front and rear surfaces) of the wireless communication device. To accommodate for this constraint, FR3 antenna array modules may be installed with a tilt relative to the short edges. The tilted surface of an FR3 antenna array may thus become the hypotenuse of a right triangle, where a short edge and an adjoining front or rear surface of the wireless communication device become the legs of that triangle. The tilt permits the width of the antenna array module to be packaged within the confines of the wireless communication device.

FIGS. 4A, 4B, and 4C are schematic drawings illustrating a front view, top view, and left side view, respectively, of a wireless communication device 400 according to some aspects of the disclosure. The wireless communication device 400 may be similar to any UE, scheduled entity, or wireless communication device as shown and described in connection with FIGS. 1 and/or 2. The wireless communication device 400 includes a housing 402 with a given length, width, depth, and a generally rectangular form. As depicted in the front view of FIG. 4A, the wireless communication device 400 includes three antenna array modules. A first antenna array module 404 is positioned adjacent to and parallel with a left side of the wireless communication device 400. A second antenna array module 406 is positioned adjacent to and parallel with a right side of the wireless communication device 400. A third antenna array module 408 is positioned adjacent to and parallel with a top side of the wireless communication device 400. FIG. 4B provides a top view of the wireless communication device 400. FIG. 4C provides a left side view of the wireless communication device 400. In FIG. 4C, the orientation of the third antenna array module 408 is observed as being parallel to the top of the wireless communication device 400. In the illustrative example of FIG. 4C, the third antenna array module 408 is un-tilted. An outward-facing face of the antennas of the third antenna array module 408 is parallel to the top edge of the wireless communication device 400. According to some aspects, the third antenna array module 408 may be an FR2 antenna array module.

In FR2 (and in higher frequency bands), multiple strategically located antenna modules (sometimes referred to as antenna panels) may be used to provide spherical coverage. Each FR2 antenna module may be equipped with one or more radio frequency integrated circuits (RFICs). In some examples, one RFIC may serve one or more antenna modules. In FIGS. 4A, 4B, and 4C (and other figures herein), the RFIC is omitted to avoid cluttering the drawings. In the examples of FIGS. 4A, 4B, and 4C, the first antenna array module 404 and the second antenna array module 406 are respectively located on the two long edges of the housing 402 (e.g., along the length dimension of the housing 402) corresponding to the right and left sides of the housing 402. The third antenna array module 408 is located on one short edge of the housing 402 (e.g., along the width dimension of the housing 402) corresponding to the top edge of the housing 402.

By way of example and without limitation, each of the three FR2 antenna array modules (first antenna array module 404, second antenna array module 406, and third antenna array module 408) may have a dual-polarized Nx1 antenna array. In some examples, N is an integer ranging from 4 to 6; however, N may be less than 4 or greater than six. Antennas within a given antenna array module may be placed at a distance separation of one half-wavelength (V2) for an appropriately chosen carrier frequency. Thus, in FR2 (at 24-30 GHz), with being 10-12.5 mm, antennas may be placed 5-6.25 mm apart. The present-day form factors (length×width×depth) of wireless communication devices (e.g., cellular phones, mobile devices, UEs) permit the placement of the antennas (also referred to as antenna elements) of an Nx1 FR2 antenna array module to be placed parallel to the short (e.g., top and/or bottom "width" dimensions) and/or parallel to the long (e.g., right and/or left "length" dimensions) edges of the wireless communication device housing 402. As shown in FIGS. 4A, 4B, and 4C, in these locations there may be no need for antenna array tilting to accommodate the width of the face of the antenna array/antenna array module, where the width of the antenna array module corresponds to the depth of the housing 402.

FIGS. 5A, 5B, 5C, and 5D are schematic drawings illustrating a front view, top view, a left side view, and a partial view, respectively, of a wireless communication device 500 according to some aspects of the disclosure. The wireless communication device 500 may be similar to any UE, scheduled entity, or wireless communication device as shown and described in connection with FIGS. 1, 2, and/or 4. The partial view of FIG. 5D provides an enlargement of a portion of FIG. 5C. The wireless communication device 500 includes a housing 502 similar to the housing 402 of FIGS. 4A, 4B, and 4C. The wireless communication device 500 may have a generally rectangular form as illustrated n FIGS. 5A, 5B, and 5C.

As depicted in the front view of FIG. 5A, the wireless communication device 500 includes four antenna array modules. A first antenna array module 504 (similar to first antenna array module 404 as shown and described in connection with FIG. 4A) is positioned adjacent to and parallel with a left side of the housing 502 of the wireless communication device 500. A second antenna array module 506 (similar to second antenna array module 406 as shown and described in connection with FIG. 4A) is positioned adjacent to and parallel with a right side of the housing 502 of the wireless communication device 500. A third antenna array module 508 (similar to third antenna array module 408 as shown and described in connection with FIG. 4A) is positioned adjacent to and parallel with a top side of the housing 502 of the wireless communication device 500. A fourth antenna array module 510 is positioned adjacent to the top side of the housing 502 of the wireless communication device 500. In this example, the fourth antenna array module 510 is adjacent to the third antenna array module 508; that is, both the third antenna array module 508 and the fourth antenna array module 510 are positioned adjacent to the top side of the housing 502 of the wireless communication device 500. In the example of FIGS. 5A, 5B, 5C, and 5D, the third antenna array module 508 may be an FR2 antenna array module and the fourth antenna array module 510 may be an FR3 antenna array module.

As shown in FIG. 5D, the fourth antenna array module 510 is tilted relative to the top side of the wireless communication device 500. The tilt angle is given as 0 degrees. The tilt of 0 degrees may be described as a clockwise rotation of the fourth antenna array module 510 around the X-axis (where the X-axis is perpendicular to the Y-Z plane). The representation of 0 degrees is illustrative and not limiting. Also as illustrated in FIG. 5D, the third antenna array module 508 remains oriented parallel (un-tilted) to the top side of the wireless communication device 500. FIG. 5B provides a top view of the wireless communication device 500. FIG. 5C provides a left side view of the wireless communication device 500. The third antenna array module 508 is not depicted in FIG. 5C to avoid cluttering the drawing. As noted above, in the example of FIGS. 5A, 5B, 5C, and 5D, the third antenna array module 508 may be an FR2 antenna array module and the fourth antenna array module 510 may be an FR3 antenna array module. In FR3 (for example, at 15 GHz), wavelength ($\lambda$) is 20 mm ($\lambda/2$ is 10 mm). Because present-day examples of wireless communication devices (e.g., cellular phones, smart phones, UEs) have an average depth of less than 8 mm, an FR3 Nx1 array may not be placed parallel to the edge. Thus, tilted antenna arrays may be used in FR3. It is also noted that an FR3 antenna array/antenna array module placed adjacent to the top side of the housing 502 may be constrained to only 2 or 3 antenna elements in an Nx1 array configuration (where N is 2 or 3). This follows from the fact that $\lambda$ in the FR3 band is longer than in the FR2 band. Antennas may be spaced apart by $\lambda/2$; accordingly, the housing 502, which may have been sufficient to receive 4 or 6 antenna elements in the FR2 band, may only accommodate 2 or 3 ($\lambda/2$ spaced) antenna elements in the FR3 band.

Figure 6A:
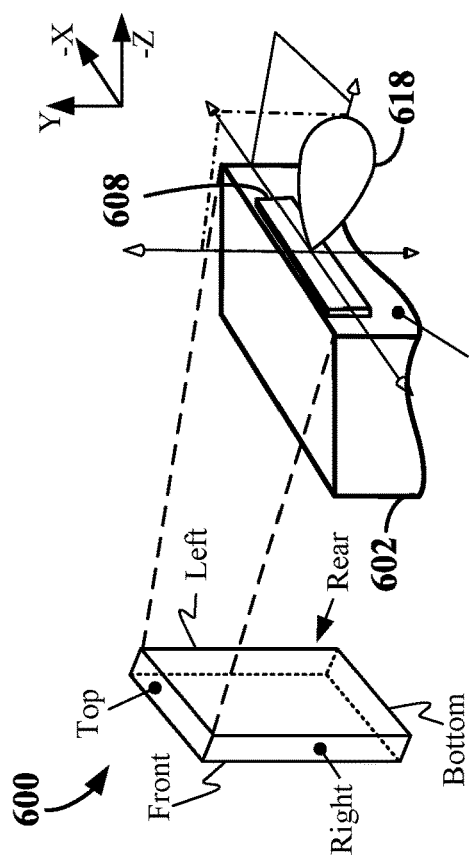
FIGS. 6A, 6B, and 6C are schematic representations of a wireless communication device according to some aspects of the disclosure
Figure 6B:
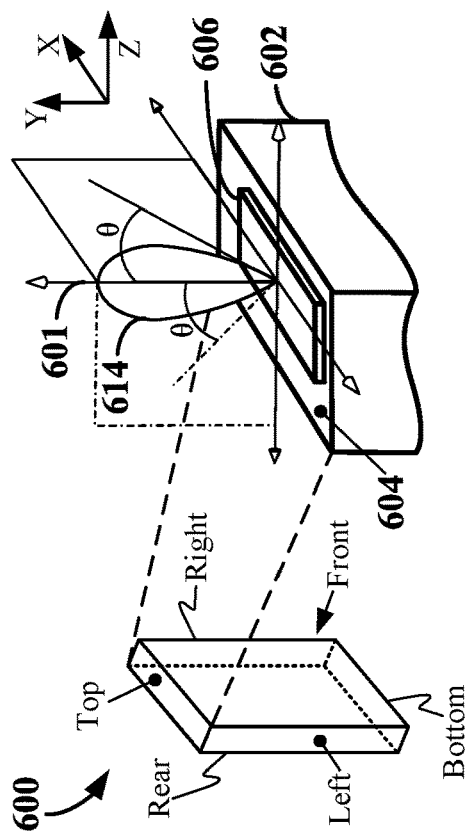
Figure 6C:
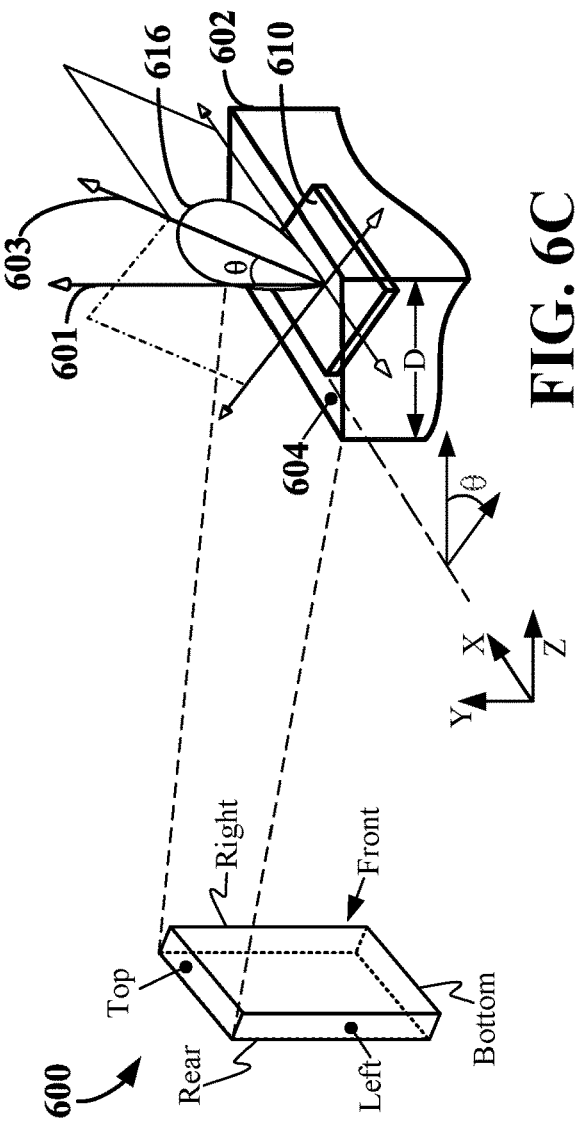

FIGS. 6A, 6B, and 6C are schematic representations of a wireless communication device 600 according to some aspects of the disclosure. The wireless communication device 600 may be similar to any UE, scheduled entity, or wireless communication device as shown and described in connection with FIGS. 1, 2, 4, and/or 5.

In FIG. 6A, a first FR2 antenna array module 606 is depicted as being parallel to a top side 604 of the housing 602 of the wireless communication device 600. In FIG. 6B, a second FR2 antenna array module 608 is depicted as being parallel to a rear side 612 of the housing 602 of the wireless communication device 600 (with a second FR2 array main lobe 618 projecting perpendicularly to the rear side 612 of the housing 602). In FIG. 6C, an FR3 antenna array module 610 is depicted as being tilted by θ degrees (in the Y-Z plane) relative to the top side 604 of the housing 602 of the wireless communication device 600.

Figure 7B:
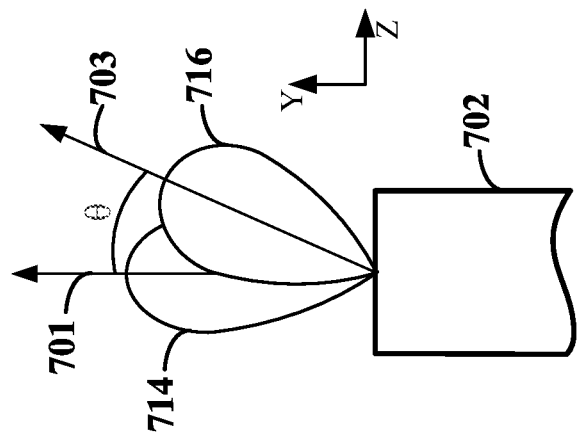
FIG. 7B illustrates a side view of the wireless communication device of FIG. 7A according to some aspects of the disclosure.
Figure 7A:
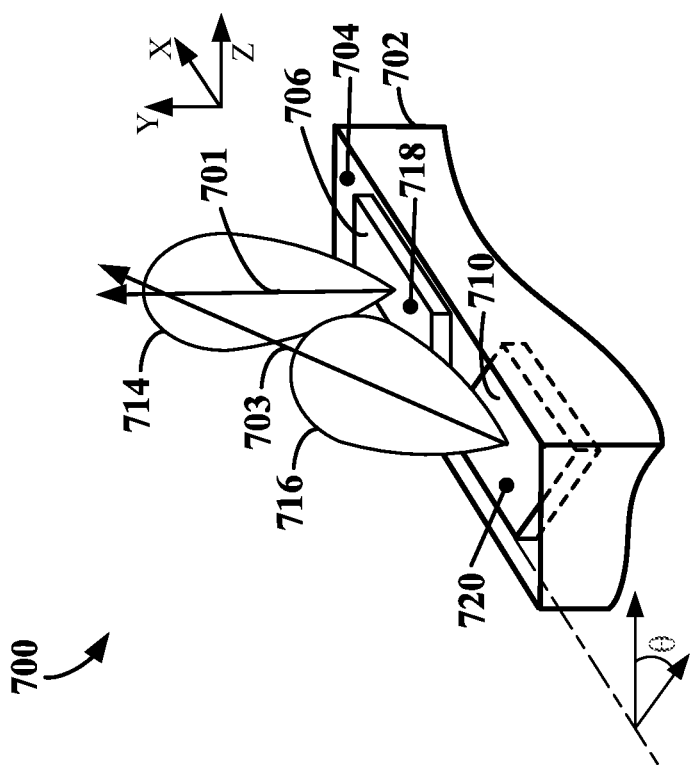
FIG. 7A illustrates a perspective view of a portion of a wireless communication device having a housing, where a first antenna array module is located adjacent to a same surface of the wireless communication device as a second antenna array module according to some aspects of the disclosure.

The dimensions of the first FR2 antenna array module 606, the second FR2 antenna array module 608, and the FR3 antenna array module 610, and all dimensions relative to each other (e.g., their relative sizes, separations, and orientations) are provided for exemplary illustrative purposes and are not intended to limit the scope of the disclosure. Additionally, as depicted in FIGS. 7A and 7B, which follow, the FR3 antenna array module 610 may be configured to be collocated with another antenna or antenna array module (not shown in FIGS. 6A, 6B, 6C), such as the first FR2 antenna array module 606 or the second FR2 antenna array module 608. Furthermore, the locations of the first FR2 antenna array module 606, the second FR2 antenna array module 608, and the FR3 antenna array module 610 are all provided for illustration and not limitation. Any antenna array module, either alone or in combination with another antenna array module may be located at any location within the wireless communication device 600 housing 602 without limitation.

In FIG. 6A, a first FR2 array main lobe 614 of the first FR2 antenna array module 606 is depicted as radiating along a first boresight direction 601 (also referred to herein as a first boresight) associated with the first FR2 antenna array module 606. As used herein, the boresight of a given antenna array module may be a direction that is perpendicular to a geometric center of the antenna array elements on a face (e.g., an antenna face, an antenna array face) of the antenna array module. In some examples, the boresight corresponds to the direction of the antenna array's main lobe when the main lobe is steered in a broadside direction. In general, an antenna may achieve its highest gain at boresight; however, this is not an absolute rule and antenna beam patterns may be designed to achieve maximum gain at in other directions. Other definitions of boresight are within the scope of the disclosure.

In FIGS. 6A, 6B, and 6C, two planes are illustrated for discussion purposes and not for limitation. A first plane, the X-Y plane, lies in the X-Y plane as illustrated in the coordinate system depicted in FIGS. 6A, 6B, and 6C. A second plane, the Y-Z plane, lies in the Y-Z plane as illustrated in the coordinate system depicted in FIGS. 6A, 6B, and 6C. The X-Y plane is perpendicular to the Y-Z plane as shown.

Loss of antenna gain at any angle relative to an antenna's boresight may be given as $10 \log 10(|\cos(\theta)|^{1.5})$, where θ is the angle off boresight in degrees. For example, for θ=15, 60, and 75 degrees, the loss may be calculated as 0.2 dB, 4.5 dB, and 8.8 dB, respectively, assuming a loss exponent of 1.5 is used as shown. The loss exponent of 1.5 is applicable to antenna element patterns that may be configured by the antenna array modules representative of the antenna array modules of FIGS. 6A, 6B, and 6C. However, in practical designs, the loss exponent could be different from 1.5. The angle θ in the X-Y and the Y-Z planes is illustrated in FIG. 6A, and in the Y-Z plane in FIG. 6C, for purposes of discussion and not limitation. The drawings are not to scale. All angles illustrated in the figures were selected at random for purposes of illustration and discussion and not to represent any absolute angular measurement.

The loss of gain of an antenna measured relative to the maximum gain (which may occur in the boresight direction) may be measured in the X-Y and the Y-Z planes (and at any point in the sphere of coverage of the antenna array module); however, the value of θ may be different in the X-Y and the Y-Z planes. In some examples the value of loss of antenna gain may be measured with a first value of θ (e.g., 0 degrees) in the X-Y plane and a second value of θ (e.g., 15 degrees) in the Y-Z plane. All angles in all planes are within the scope of the disclosure. The angle θ in the X-Y and the Y-Z planes is omitted from the illustration of FIG. 6B to reduce clutter in the drawing; however, the loss calculation as a function of the angle θ applies to FIG. 6B in the same way as it applies to FIGS. 6A and 6C.

In FIG. 6C, the FR3 antenna array module 610 is depicted in a tilted configuration. As shown, the tilt corresponds to the angle θ in the Y-Z plane. The illustration is not to scale. Because the frequencies in the FR3 band are lower than the frequencies in the FR2 band, an Nx1 antenna array configured for FR3 will be wider and longer than an Nx1 antenna array configured for FR2. Both width and length change because the antenna elements are wider for lower frequencies. The length of an antenna array may be controlled by altering the number of elements in the array. For example, to shorten a length of an FR3 antenna array relative to a length of an FR2 antenna array with initially the same Nx1 elements, the number of elements used for the FR3 antenna array may be reduced. For example, if N was initially 4 in each antenna array (e.g., 4×1 antenna arrays for both the FR3 and the FR2 arrays), the number of elements of the FR3 array could be reduced to, for example, 2 or 3 antenna elements (e.g., a 2×1 or a 3×1 FR3 antenna array may be used).

However, width may not be controlled by reduction of the number of antenna elements in an Nx1 array. As frequency is reduced, the size of the antenna element increases in both width and length. Even if the width of the antenna element of an Nx1FR3 antenna array could be reduced, the edges of the FR3 antenna element would still be closer to the adjacent edges of the housing of the wireless communication device in comparison to the edges of a corresponding FR2 antenna element. The closer the antenna elements get to the edge of the wireless communication device housing, the more the antenna pattern is affected. Consequently, an FR3 antenna array (i.e., the module that includes the FR3 antenna array, the FR3 antenna array module) may be installed with a tilt, as shown in FIG. 6C. When tilted, an FR3 antenna array module 610 may fit within the depth (D) of the wireless communication device 600 housing 602. The FR2 arrays may remain un-tilted because representative FR2 antenna array modules may be narrower than the depth (D) of the wireless communication device 600 housing 602 (e.g., narrower than the thickness of the wireless communication device). Thus, a representative FR2 antenna array module may be configured with its antenna face parallel to a top, left, right, or bottom surface of the housing 602.

Returning to the example of FIG. 6C, and as described above, the FR3 antenna array module 610 may be configured to be mechanically oriented in the housing 602 of the wireless communication device 600 with a tilt corresponding to the angle θ. In other words, the FR3 antenna array module 610 serving a second frequency band (e.g., FR3) may have a second antenna array surface (generally represented by the rectangular surface of the FR3 antenna array module 610 of FIG. 6C) that is substantially perpendicular to a second boresight direction 603 (also referred to herein as a second boresight) and oriented at an angle (e.g., the angle θ as shown and described herein) relative to the top side 604 (e.g., a first surface) of the wireless communication device 600 adjacent to the FR3 antenna array module 610.

In the example of FIG. 6C, although the entire FR3 antenna array module 610 is tilted in the Y-Z plane by the angle θ, the result of the tilt as measured along the first boresight direction 601 of the first FR2 array main lobe 614 of the first FR2 antenna array module 606 of FIG. 6A may still be estimated/determined as described above. For example, in response to the FR3 antenna array module 610 being tilted by 15 degrees, the gain of the FR3 main lobe 616 of the FR3 antenna array module 610 as measured in the first boresight direction 601 of the first FR2 array main lobe 614 may be reduced by 0.2 dB. As another example, in response to the FR3 antenna array module 610 being tilted by 60 degrees, the gain of the FR3 main lobe 616 of the FR3 antenna array module 610 as measured in the first boresight direction 601 of the first FR2 array main lobe 614 may be reduced by 4.5 dB. As still another example, in response to the FR3 antenna array module 610 being tilted by 75 degrees, the gain of the FR3 main lobe 616 of the FR3 antenna array module 610 as measured in the first boresight direction 601 of the first FR2 array main lobe 614 may be reduced by 8.8 dB.

The results are in agreement with the previously recited exemplary results described in connection with FIG. 6A because the angle θ, in the context of the example of FIG. 6C, may correspond to the angle between the first FR2 array main lobe 614 (along the first boresight direction 601) and the FR3 array main lobe 616 (along the second boresight direction 603). In such examples, the angle θ may be expressed, for example, as an angle relative to a surface (e.g., the top side 604) of the wireless communication device 600, an angle between the first boresight direction 601 of the first FR2 antenna array module 606 and the second boresight direction 603 of the FR3 antenna array module 610, an angle between the planes of the antenna faces of the two antenna array modules, etc. As described above, the first FR2 antenna array module 606 and the FR3 antenna array module 610 may be located adjacent to one another and adjacent to the same surface (e.g., the top side 604) of the housing 602 of the wireless communication device 600.

FIG. 7A illustrates a perspective view of a portion of a wireless communication device 700 (similar to the wireless communication device 600 as shown and described in connection with FIGS. 6A, 6B, and 6C) having a housing 702, where a first antenna array module 706 is located adjacent to a same surface 704 of the wireless communication device 700 as a second antenna array module 710 according to some aspects of the disclosure. In one example, the wireless communication device 700 may utilize the first antenna array module 706 to serve a first frequency band (e.g., FR2), the first antenna array module 706 may have a first antenna array surface 718 that is substantially perpendicular to a first boresight direction 701 and oriented substantially parallel to the same surface 704 of the wireless communication device 700 adjacent to the first antenna array module 706. In the same example, the wireless communication device 700 may also utilize a second antenna array module 710 to serve a second frequency band (e.g., FR3), the second antenna array module 710 being different from the first antenna array module 706 and the first frequency band (e.g., FR2) being different from the second frequency band (e.g., FR3). The second antenna array module 710 may have a second antenna array surface 720 that is substantially perpendicular to a second boresight direction 703 and oriented at an angle (e.g., the angle θ, an acute angle, that angle as shown in FIG. 7A and as shown and described in connection with FIG. 6C) relative to the same surface 704 of the wireless communication device 700 adjacent to the second antenna array module 710.

FIG. 7B illustrates a side view of the wireless communication device 700 of FIG. 7A according to some aspects of the disclosure. In the side view of FIG. 7B, the first antenna array module 706, and the second antenna array module 710 are obscured from view by the exterior of the housing 702 of the wireless communication device 700. The angle θ, between the first main lobe 714 (along the first boresight direction 701) and the second main lobe 716 (along the second boresight direction 703) is illustrated in FIG. 7A and FIG. 7B.

Because the second antenna array module 710 (e.g., the FR3 antenna array module) is titled by the angle θ (as illustrated in FIGS. 7A and 7B), the first main lobe 714 of the first antenna array module 706 (e.g., the FR2 antenna array module) points in a different direction from the second main lobe 716 of the second antenna array module 710 (e.g., the FR3 antenna array module). In the example of FIGS. 7A and 7B, the maximum gain of the first antenna array module 706 may be aligned with the first boresight direction 701. The maximum gain of the second antenna array module 710 may be aligned with the second boresight direction 703. Relative to the direction toward/from which the wireless communication device 700 obtains the maximum gain of the first main lobe 714 (of the first antenna array module 706), the gain obtained by the second main lobe 716 (of the second antenna array module 710) is reduced (i.e., reduced from its peak gain, similar to the reductions described in connection with FIGS. 6A, 6B, and 6C) because the angle of the second main lobe 716 is tilted relative to the angle of the first main lobe 714 by the angle θ.

Consequently, when TCI states are determined, the channels observed in the first frequency band (e.g., FR2) of the first antenna array module 706 may have less loss than the same channels observed in the second frequency band (e.g., FR3) of the second antenna array module 710. This change of gain (e.g., a comparative gain, a differential gain, etc.) may affect the channels' quasi-co-location (QCL) relationships across frequencies. Therefore, some TCI states may be less than helpful as carrier frequencies change. However, according to some aspects of the disclosure, the wireless communication device 700 may transmit an indication of a set of transmission configuration indicator (TCI) states for use in the first frequency band (e.g., FR2) and the second frequency band (e.g., FR3), where the set of TCI states may be selected based on the angle (e.g., the angle θ, the angle relative to a first surface (e.g., the same surface 704) of the wireless communication device adjacent to the second antenna array module 710, the angle between the first boresight direction 701 and the second boresight direction 703, the angle between the first antenna array surface 718 and the second antenna array surface 720, etc.). In the examples described herein, the angle (e.g., the angle θ, etc.) may be an acute angle.

Figure 8:
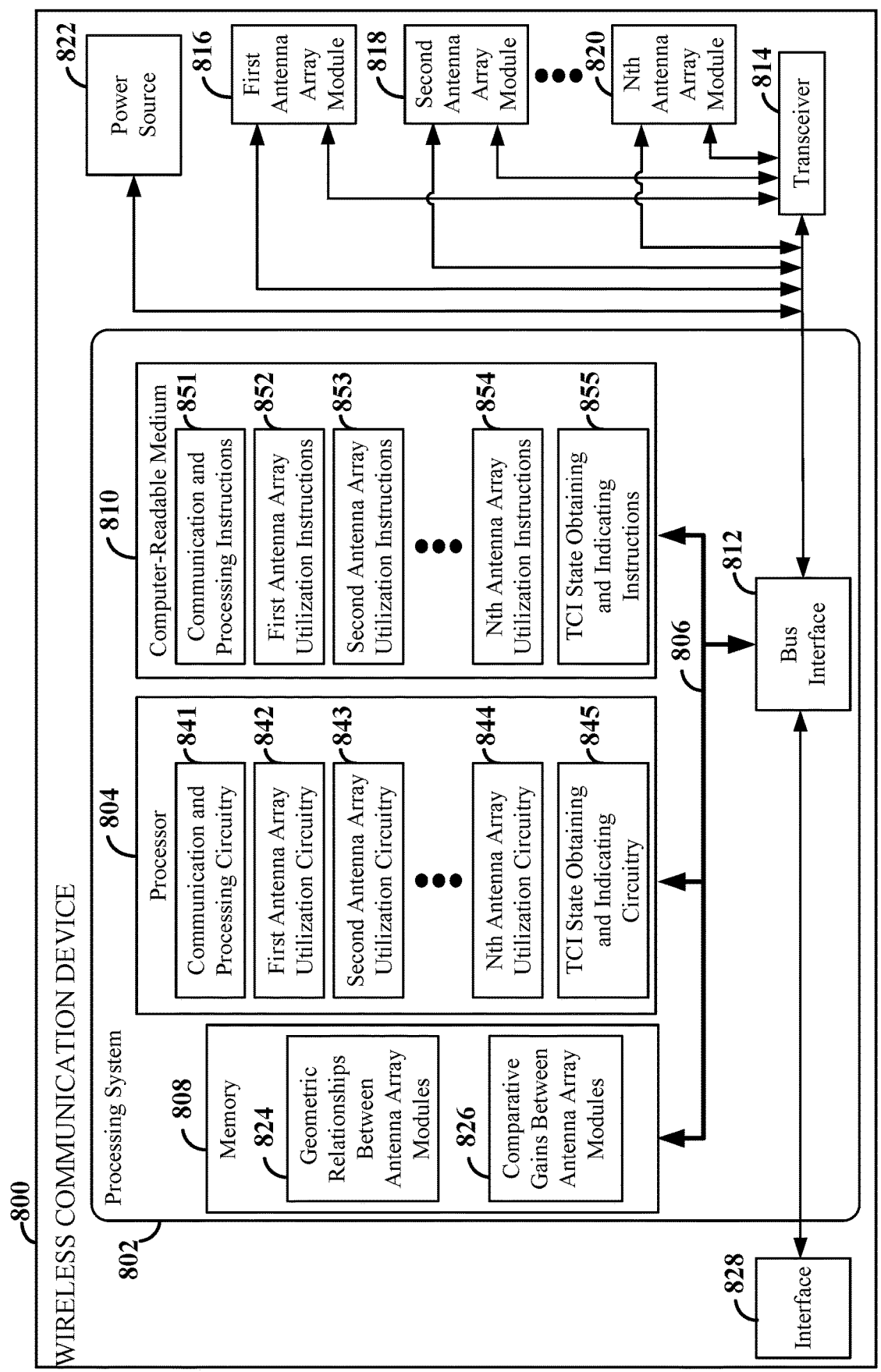
FIG. 8 is a block diagram illustrating an example of a hardware implementation of a wireless communication device employing a processing system according to some aspects of the disclosure.

FIG. 8 is a block diagram illustrating an example of a hardware implementation of a wireless communication device 800 (e.g., a UE) employing a processing system 802 according to some aspects of the disclosure. The wireless communication device 800 may be a scheduled entity; it may be similar to any one or more of the wireless communication devices illustrated and described in FIGS. 1, 2, 4A-C, 5A-D, 6A-C, and/or 7A-B.

In accordance with various aspects of the disclosure, an element, or any portion of an element, or any combination of elements may be implemented with a processing system 802 that includes one or more processors, such as processor 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 800 may be configured to perform any one or more of the functions described herein. That is, the processor 804, as utilized in the wireless communication device 800, may be used to implement any one or more of the methods or processes described and/or illustrated, for example, in any one or more of FIGS. 4A-C, 5A-D, 6A-C, and/or 7A-B.

The processor 804 may, in some examples, be implemented via a baseband or modem chip, and in other implementations, the processor 804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 802 may be implemented with a bus architecture, represented generally by the bus 806. The bus 806 may include any number of interconnecting buses and bridges depending on the specific application of the processing system 802 and the overall design constraints. The bus 806 couples together (e.g., communicatively couples) various circuits, including one or more processors (represented generally by the processor 804), a memory 808, and computer-readable media (represented generally by the computer-readable medium 810). The bus 806 may also link various other circuits such as timing sources, peripherals, voltage regulators, and power management circuits, which are well known in the art, and therefore, will not be described any further.

A bus interface 812 provides an interface between the bus 806 and one or more transceivers (represented generally by transceiver 814). The transceiver 814 may be a wireless transceiver. The transceiver 814 may provide a means for communicating with various other apparatus over a transmission medium (e.g., air interface). The transceiver 814 may further be coupled to a plurality of antenna array modules including a first antenna array module 816 and a second antenna array module 818. The plurality of antenna array modules may be represented by the first antenna array module 816 and the second antenna array module 818 through the Nth antenna array module 820. Each of the plurality of antenna array modules may be coupled (e.g., communicatively coupled) to at least one of the one or more transceivers (represented generally by transceiver 814)

The bus interface 812 further provides an interface between the bus 806 and a user interface 828 (e.g., keypad, display, touch screen, speaker, microphone, control features, etc.). Of course, such a user interface 828 is optional and may be omitted in some examples. In addition, the bus interface 812 further provides an interface between the bus 806 and a power source 822 of the wireless communication device 800.

The processor 804 is responsible for managing the bus 806 and general processing, including the execution of software stored on the computer-readable medium 810. The software, when executed by the processor 804, causes the processing system 802 to perform the various functions described below for any particular apparatus. The computer-readable medium 810 and the memory 808 may also be used for storing data that is manipulated by the processor 804 when executing software. In one example, the data may include data located in a portion of the memory 808 that may store geometric relationships between antenna array modules 824 as described in connection with some aspects of the disclosure. In another example, the data may include data located in a portion of the memory 808 that may store comparative gains between antenna array modules 826 as described in connection with some aspects of the disclosure. In some examples, the comparative gains may be stored as a function of an angle (e.g., the angle θ) between, for example, main lobes of respective antenna array modules, between respective boresights of the antenna array modules, between the planes of the respective antenna faces of any of the plurality of antenna array modules, etc. of the wireless communication device 800.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 810. When executed by the processor 804, the software may cause the processing system 802 to perform the various processes and functions described herein for any particular apparatus.

The computer-readable medium 810 may be a non-transitory computer-readable medium and may be referred to as a computer-readable storage medium or a non-transitory computer-readable medium. The non-transitory computer-readable medium may store computer-executable code (e.g., processor-executable code). The computer-executable code may include code for causing a computer (e.g., a processor)

to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 810 may reside in the processing system 802, external to the processing system 802, or distributed across multiple entities including the processing system 802. The computer-readable medium 810 may be embodied in a computer program product or article of manufacture. By way of example, a computer program product or article of manufacture may include a computer-readable medium in packaging materials. In some examples, the computer-readable medium 810 may be part of the memory 808. Those skilled in the art will recognize how best to implement the described functionality presented throughout this disclosure depending on the particular application and the overall design constraints imposed on the overall system.

In some aspects of the disclosure, the processor 804 may include communication and processing circuitry 841 configured for various functions, including, for example, communicating with other wireless communication devices (e.g., a scheduling entity, a scheduled entity), a network core (e.g., a 5G core network), or any other entity, such as, for example, local infrastructure or an entity communicating with the wireless communication device 800 via the Internet, such as a network provider. In some examples, the communication and processing circuitry 841 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 841 may include one or more transmit/receive chains.

In some implementations where the communication involves receiving information, the communication and processing circuitry 841 may obtain or identify information from a component of the wireless communication device 800 (e.g., from the transceiver 814 that receives the information via radio frequency signaling or some other type of signaling suitable for the applicable communication medium), process (e.g., decode) the information, and output the processed information. For example, the communication and processing circuitry 841 may output the information to another component of the processor 804, to the memory 808, or to the bus interface 812. In some examples, the communication and processing circuitry 841 may receive one or more of: signals, messages, other information, or any combination thereof. In some examples, the communication and processing circuitry 841 may receive information via one or more channels. In some examples, the communication and processing circuitry 841 may include functionality for a means for receiving. In some examples, the communication and processing circuitry 841 may include functionality for a means for processing, including a means for demodulating, a means for decoding, etc.

In some implementations where the communication involves sending (e.g., transmitting) information, the communication and processing circuitry 841 may obtain or identify information (e.g., from another component of the processor 804, the memory 808, or the bus interface 812), process (e.g., modulate, encode, etc.) the information, and output the processed information. For example, the communication and processing circuitry 841 may obtain data stored in the memory 808 and may process the obtained data according to some aspects of the disclosure.

In some examples, the communication and processing circuitry 841 may obtain information and output the information to the transceiver 814 (e.g., transmitting the information via radio frequency signaling or some other type of signaling suitable for the applicable communication medium). In some examples, the communication and processing circuitry 841 may send one or more of signals, messages, other information, or any combination thereof. In some examples, the communication and processing circuitry 841 may send information via one or more channels. In some examples, the communication and processing circuitry 841 may include functionality for a means for sending (e.g., a means for transmitting). In some examples, the communication and processing circuitry 841 may include functionality for a means for generating, including a means for modulating, a means for encoding, etc. In some examples, the communication and processing circuitry 841 may be configured to receive and process uplink traffic and uplink control messages (e.g., similar to uplink traffic 116 and uplink control information 118 of FIG. 1) and process and transmit downlink traffic and downlink control messages (e.g., similar to downlink traffic 112 and downlink control information 114 of FIG. 1) via any of the plurality of antenna array modules (represented generally by the first antenna array module 816 and the second antenna array module 818 through the Nth antenna array module 820) and the transceiver 814.

The communication and processing circuitry 841 may further be configured to execute communication and processing instructions 851 (e.g., software) stored on the computer-readable medium 810 to implement one or more functions described herein.

In some aspects of the disclosure, the processor 804 may include the first antenna array utilization circuitry 842. The first antenna array utilization circuitry 842 may be configured for various functions, including, for example, utilizing the first antenna array module 816 (e.g., an antenna array module configured to operate in the FR2 frequency band, the first antenna array module 706 as shown and described in connection with FIGS. 7A and 7B). The first antenna array module 816 may serve a first frequency band (e.g., the FR2 frequency band). In some examples the first antenna array module 816 may have a first antenna array surface (e.g., the first antenna array surface 718 as shown and described in connection with FIGS. 7A and 7B). The first antenna array surface (e.g., the first antenna array surface 718 as shown and described in connection with FIGS. 7A and 7B) may be substantially perpendicular to a first boresight (e.g., first boresight direction 701 as shown and described in connection with FIGS. 7A and 7B). The first antenna array surface 718 may be oriented substantially parallel to a first surface (e.g., same surface 704 as shown and described in connection with FIG. 7A) of the wireless communication device 800 adjacent to the first antenna array module 816. The first antenna array utilization circuitry 842 may be configured to execute first antenna array utilization instructions 852 (e.g., software), all stored, for example, on the computer-readable medium 810 to implement one or more functions described herein.

In some aspects of the disclosure, the processor 804 may include second antenna array utilization circuitry 843. The second antenna array utilization circuitry 843 may be configured for various functions, including, for example, utilizing the second antenna array module 818 (e.g., an antenna array module configured to operate in the FR3 frequency band, the second antenna array module 710 as shown and described in connection with FIGS. 7A and 7B). The second antenna array module 818 may serve a second frequency band (e.g., the FR3 band). According to aspects described herein, the first antenna array module 816 may be different from the second antenna array module 818. The first frequency band (e.g., FR2) may be different from the second frequency band (e.g., FR3). In some examples, the second antenna array module 818 may have a second antenna array surface (e.g., the second antenna array surface 720 as shown and described in connection with FIGS. 7A and 7B). The second antenna array surface (e.g., the second antenna array surface 720 as shown and described in connection with FIGS. 7A and 7B) may be substantially perpendicular to a second boresight (e.g., second boresight direction 703 as shown and described in connection with FIGS. 7A and 7B). The second antenna array surface may be oriented at an angle relative to a second surface of the wireless communication device adjacent to the second antenna array module 818; however, according to some aspects, the first surface and the second surface are a same surface (e.g., the same surface 704 as shown and described in connection with FIGS. 7A and 7B). The second antenna array utilization circuitry 843 may be configured to execute second antenna array utilization instructions 853 (e.g., software), all stored, for example, on the computer-readable medium 810 to implement one or more functions described herein.

In some aspects of the disclosure, the processor 804 may include more antenna array utilization circuitry, up to and including the Nth antenna array utilization circuitry 844. The Nth antenna array utilization circuitry 844 may be similar to the first antenna array utilization circuitry 842 and/or the second antenna array utilization circuitry 843. A discussion of the features of the Nth antenna array utilization circuitry 844 is therefore omitted for the sake of brevity. The Nth antenna array utilization circuitry 844 may be configured to execute Nth antenna array utilization instructions 854 (e.g., software), all stored, for example, on the computer-readable medium 810 to implement one or more functions described herein.

In some aspects of the disclosure, the processor 804 may include TCI state obtaining and indicating circuitry 845. The TCI state obtaining and indicating circuitry 845 may be configured for various functions, including, for example, obtaining an indication of a set of transmission configuration indicator (TCI) states for use in the first frequency band and the second frequency band, the set of TCI states being selected based on the angle. The TCI state obtaining and indicating circuitry 845 may also be configured for various additional functions, including, for example, transmitting an indication (e.g., the obtained indication) of a set of transmission configuration indicator (TCI) states for use in the first frequency band and the second frequency band, the set of TCI states being selected based on the angle. According to some aspects, the set of TCI states may be limited based on a link loss expected across the first and second bands. In some examples, the link loss in a given direction relative to the wireless communication device may be obtained utilizing a first directional gain of the first antenna array module and a second directional gain of the second antenna array module.

According to some aspects, the TCI state obtaining and indicating circuitry 845, for example in connection with the communications and processing circuitry 841, may obtain a geometric relationship, for example, between the first antenna array module 816 and the second antenna array module 818. The TCI state obtaining and indicating circuitry 845 may also obtain, based on comparative gains associated with the geometric relationship between the first antenna array module 816 and the second antenna array module 818, a first indication that a quality of service will increase in response to changing transmission and reception operations from the first antenna array module 816 to the second antenna array module 818, or from the second antenna array module 818 to the first antenna array module 816. The wireless communication device may then transmit a recommendation to change the transmission and reception operations between the first antenna array module and the second antenna array module in accordance with a content of the first indication.

In some examples, the geometric relationship and the comparative gains may be obtained from the memory 808 (e.g., from storage locations such as the geometric relationships between antenna array modules 824 storage location and the comparative gains between antenna array modules 826 storage location).

According to some aspects, the TCI state obtaining and indicating circuitry 845 may be configured to receive an instruction to change transmission and reception operations from: the first antenna array module to the second antenna array module, or the second antenna array module to the first antenna array module. The TCI state obtaining and indicating circuitry 845, for example in connection with the transceiver 814 and one of the plurality of antenna array modules, may further be configured to transmit a recommendation against changing the transmission and reception operations based on obtaining a second indication that a quality of service will decrease in response to carrying out the instruction.

According to some aspects, the TCI state obtaining and indicating circuitry 845, for example in connection with the transceiver 814 and one of the plurality of antenna array modules, may further be configured to transmit an indication of a mechanical configuration of the plurality of antenna array modules, including the first antenna array module and the second antenna array module, receive a restricted set of TCI states based on the indication of the mechanical configuration, and select the set of TCI states from the restricted set of TCI states.

The TCI state obtaining and indicating circuitry 845 may be configured to execute TCI state obtaining and indicating instructions 855 (e.g., software) stored on the computer-readable medium 810 to implement one or more functions described herein.

Figure 9:
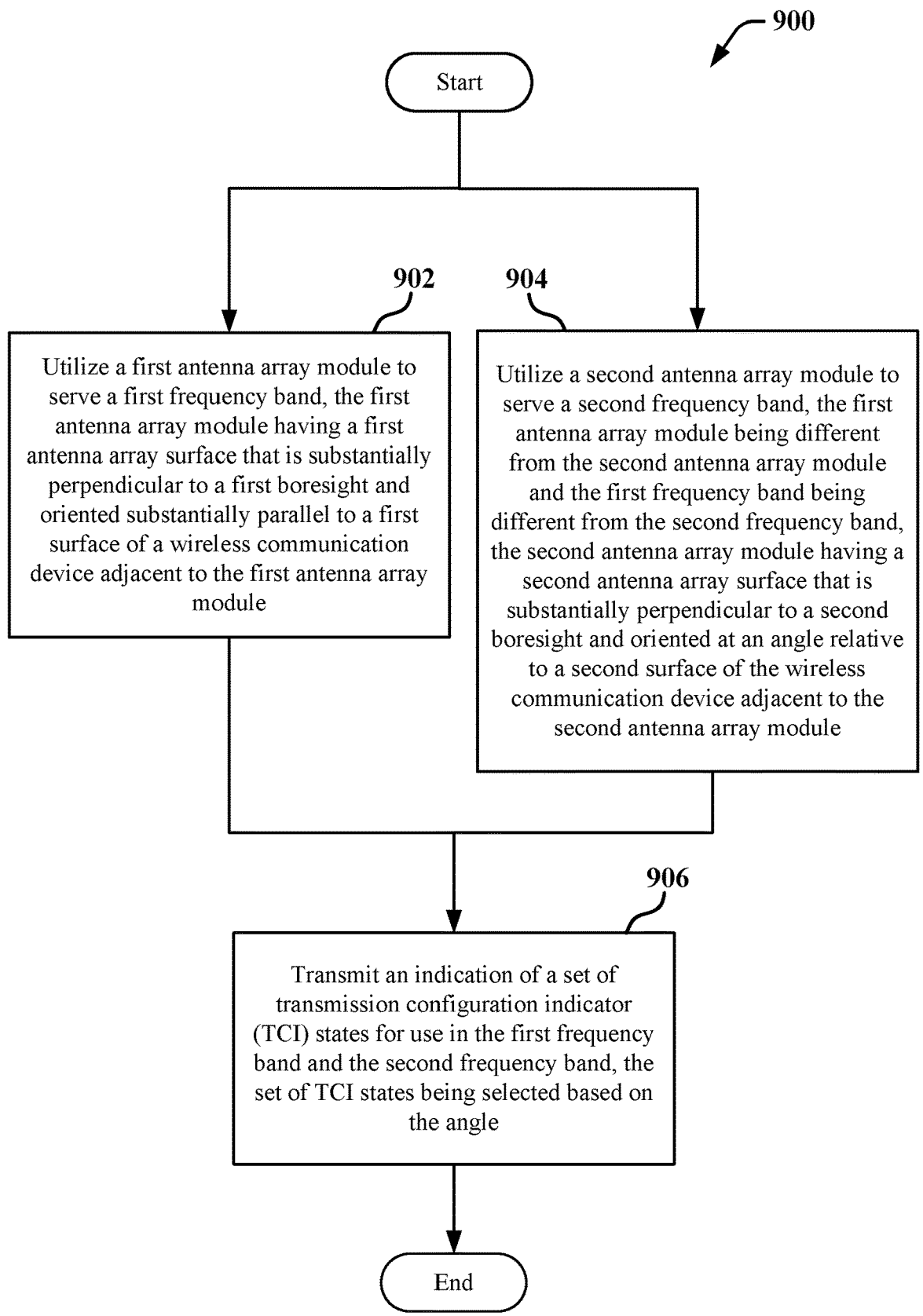
FIG. 9 is a flow chart illustrating an exemplary process at a wireless communication device according to some aspects of the disclosure.

FIG. 9 is a flow chart illustrating an exemplary process 900 (e.g., a method of wireless communication) at a wireless communication device (e.g., at a scheduled entity, at a user equipment (UE)) according to some aspects of the disclosure. The process 900 may occur in a wireless communication network, such as the wireless communication networks of FIGS. 1 and/or 2, for example. As described below, some or all illustrated features may be omitted in a particular implementation within the scope of the present disclosure, and some illustrated features may not be required for all implementations. In some examples, the process 900 may be carried out by the wireless communication device 800 described and illustrated in connection with FIG. 8. In some examples, the process 900 may be carried out by any suitable apparatus or means for carrying out the functions or algorithms described herein.

At block 902, the wireless communication device may utilize a first antenna array module to serve a first frequency band; the first antenna array module may have a first antenna array surface that is substantially perpendicular to a first boresight and oriented substantially parallel to a first surface of the wireless communication device adjacent to the first antenna array module. For example, the first antenna array utilization circuitry 842, as shown and described in connection with FIG. 8, may provide a means for utilizing a first antenna array module to serve a first frequency band, the first antenna array module having a first antenna array surface that is substantially perpendicular to a first boresight and oriented substantially parallel to a first surface of the wireless communication device adjacent to the first antenna array module.

At block 904, the wireless communication device may utilize a second antenna array module to serve a second frequency band, the first antenna array module being different from the second antenna array module and the first frequency band being different from the second frequency band. The second antenna array module may have a second antenna array surface that is substantially perpendicular to a second boresight and oriented at an angle relative to a second surface of the wireless communication device adjacent to the second antenna array module. For example, the second antenna array utilization circuitry 843, as shown and described in connection with FIG. 8, may provide a means for utilizing a second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module. According to some aspects, the first and second surfaces are the same surfaces.

At block 906, the wireless communication device may transmit an indication of a set of transmission configuration indicator (TCI) states for use in the first frequency band and the second frequency band. The set of TCI states may be selected based on the angle. For example, the TCI state obtaining and indicating circuitry 845, in combination with, for example, the transceiver 814 and one of the plurality of antenna array modules, as shown and described in connection with FIG. 8, may provide a means for transmitting an indication of a set of transmission configuration indicator (TCI) states for use in the first frequency band and the second frequency band, the set of TCI states being selected based on the angle.

According to some aspects, the set of TCI states may be limited based on a link loss expected across the first and second bands. According to some aspects, the link loss in a given direction relative to the wireless communication device may be obtained utilizing a first directional gain of the first antenna array module and a second directional gain of the second antenna array module.

According to some aspects, the wireless communication device may transmit an indication of a mechanical configuration of the plurality of antenna array modules, including the first antenna array module and the second antenna array module, and may receive a restricted set of TCI states based on the indication of the mechanical configuration, and may select the set of TCI states from the restricted set of TCI states. For example, the TCI state obtaining and indicating circuitry 845, in connection with, for example, the transceiver 814 and at least one of the plurality of antenna array modules, may provide a means for transmitting an indication of a mechanical configuration of the plurality of antenna array modules, including the first antenna array module and the second antenna array module, a means for receiving a restricted set of TCI states based on the indication of the mechanical configuration, and a means for selecting the set of TCI states from the restricted set of TCI states.

According to some aspects, the first and second surfaces may be the same surfaces. Furthermore, the first boresight of the first antenna array module and the second boresight of the second antenna array module may be oriented at the angle relative to each other.

Figure 10:
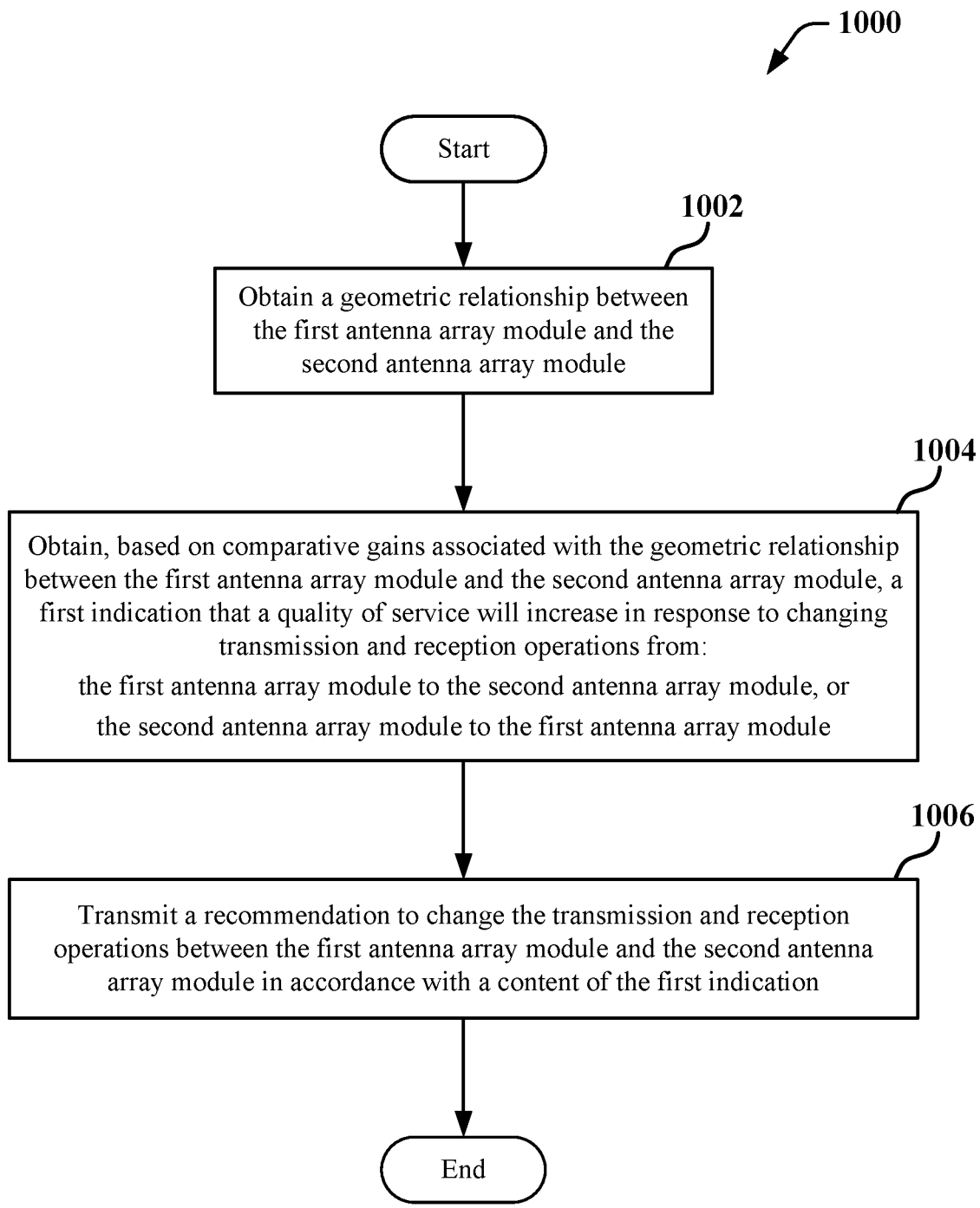
FIG. 10 is a flow chart illustrating an exemplary process at a wireless communication device according to some aspects of the disclosure.

FIG. 10 is a flow chart illustrating an exemplary process 1000 (e.g., a method of wireless communication) at a wireless communication device (e.g., at a scheduled entity, at a user equipment (UE)) according to some aspects of the disclosure. The process 1000 may occur in a wireless communication network, such as the wireless communication networks of FIGS. 1 and/or 2, for example. As described below, some or all illustrated features may be omitted in a particular implementation within the scope of the present disclosure, and some illustrated features may not be required for all implementations. In some examples, the process 1000 may be carried out by the wireless communication device 800 described and illustrated in connection with FIG. 8. In some examples, the process 1000 may be carried out by any suitable apparatus or means for carrying out the functions or algorithms described herein.

At block 1002, the wireless communication device may obtain a geometric relationship between the first antenna array module and the second antenna array module. For example, the communication and processing circuitry 841 may provide the means for obtaining the geometric relationship between the first antenna array module and the second antenna array module from the memory 808, as shown and described in connection with FIG. 8. In one example, the geometric relationship may be stored in a geometric relationships between antenna array modules 824 location of the memory 808.

At block 1004, the wireless communication device may obtain, based on comparative gains associated with the geometric relationship between the first antenna array module and the second antenna array module, a first indication that a quality of service will increase in response to changing transmission and reception operations from: the first antenna array module to the second antenna array module, or the second antenna array module to the first antenna array module. For example, the communication and processing circuitry 841, as shown and described in connection with FIG. 8, may provide a means for obtaining, based on comparative gains associated with the geometric relationship between the first antenna array module and the second antenna array module, a first indication that a quality of service will increase in response to changing transmission and reception operations from: the first antenna array module to the second antenna array module, or the second antenna array module to the first antenna array module. In some examples, the comparative gains may be obtained from the memory 808 (e.g., from a storage locations such as the comparative gains between antenna array modules 826 storage location).

At block 1006, the wireless communication device may transmit a recommendation to change the transmission and reception operations between the first antenna array module and the second antenna array module in accordance with a content of the first indication. For example, the communication and processing circuitry 841, in combination with, for example, the transceiver 814 and one of the plurality of antenna array modules, as shown and described in connection with FIG. 8, may provide a means for transmitting a recommendation to change the transmission and reception operations between the first antenna array module and the second antenna array module in accordance with a content of the first indication.

Figure 11:
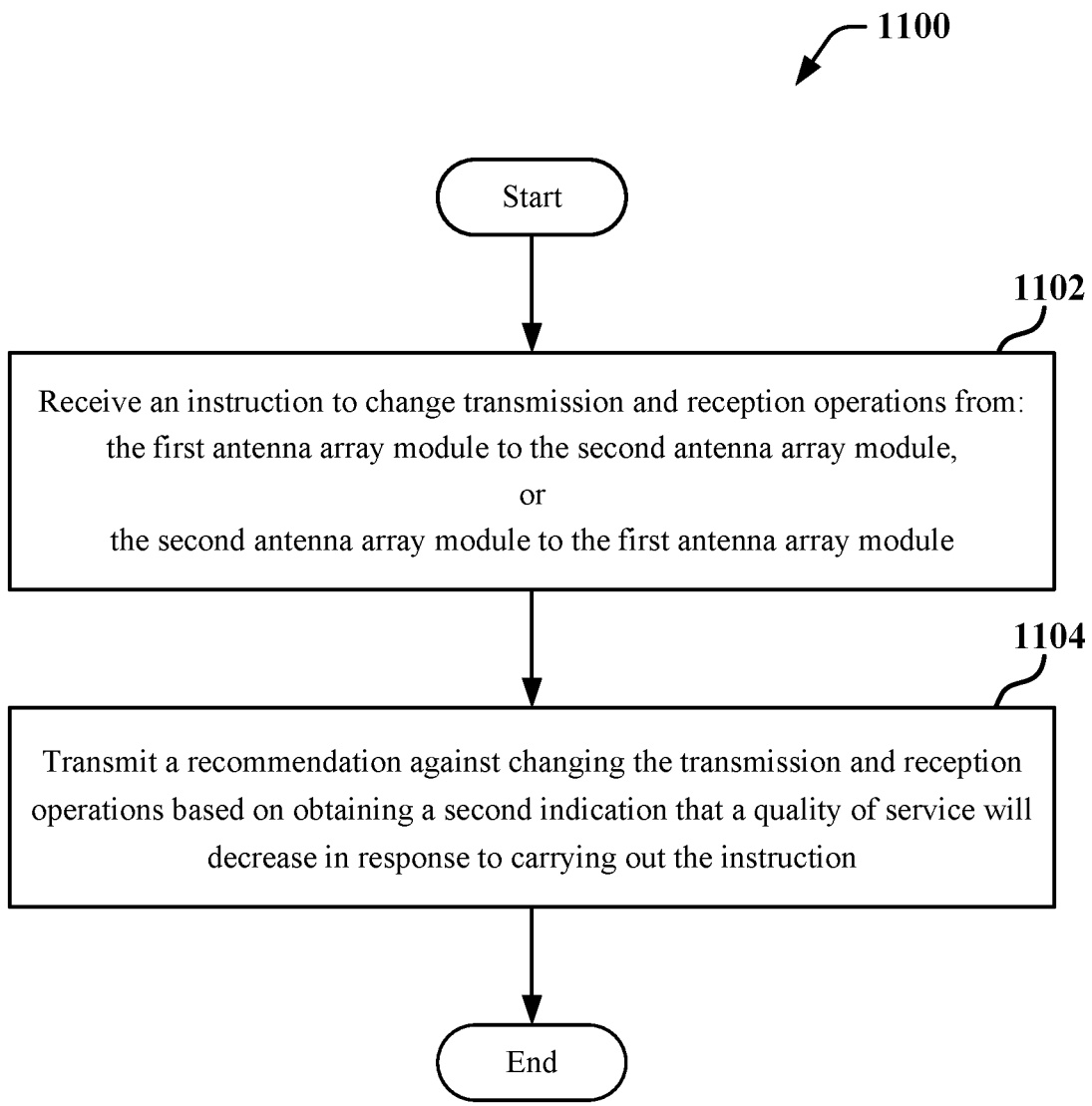
FIG. 11 is a flow chart illustrating an exemplary process at a wireless communication device according to some aspects of the disclosure.

FIG. 11 is a flow chart illustrating an exemplary process 1100 (e.g., a method of wireless communication) at a wireless communication device (e.g., at a scheduled entity, at a user equipment (UE)) according to some aspects of the disclosure. The process 1100 may occur in a wireless communication network, such as the wireless communication networks of FIGS. 1 and/or 2, for example. As described below, some or all illustrated features may be omitted in a particular implementation within the scope of the present disclosure, and some illustrated features may not be required for all implementations. In some examples, the process 1100 may be carried out by the wireless communication device 800 described and illustrated in connection with FIG. 8. In some examples, the process 1100 may be carried out by any suitable apparatus or means for carrying out the functions or algorithms described herein.

At block 1102, the wireless communication device may receive an instruction to change transmission and reception operations from: the first antenna array module to the second antenna array module, or the second antenna array module to the first antenna array module. For example, the communication and processing circuitry 841, in connection with the transceiver 814 and at least one of the plurality of antenna array modules, may provide a means for receiving an instruction to change transmission and reception operations from: the first antenna array module to the second antenna array module, or the second antenna array module to the first antenna array module.

At block 1104, the wireless communication device may transmit a recommendation against changing the transmission and reception operations based on obtaining a second indication that a quality of service will decrease in response to carrying out the instruction. For example, the communication and processing circuitry 841, in connection with the transceiver 814 and at least one of the plurality of antenna array modules, may provide a means for transmitting a recommendation against changing the transmission and reception operations based on obtaining a second indication that a quality of service will decrease in response to carrying out the instruction.

Of course, in the above examples, the circuitry included in the processor 804 is merely provided as an example. Other means for carrying out the described processes or functions may be included within various aspects of the present disclosure, including but not limited to the instructions stored in the computer-readable medium 810 or any other suitable apparatus or means described in any one of the FIGS. 1, 2, 4A-C, 5A-D, 6A-C, 7A-B, and/or 8 and utilizing, for example, the processes and/or algorithms described herein in relation to FIGS. 9-11.

The following provides an overview of aspects of the present disclosure:

Aspect 1: A wireless communication device, comprising: one or more transceivers, a plurality of antenna array modules including a first antenna array module and a second antenna array module, each of the plurality of antenna array modules coupled to at least one of the one or more transceivers; a memory, and a processor coupled to the one or more transceivers, the plurality of antenna array modules, and the memory, wherein the processor and the memory are configured to: utilize the first antenna array module to serve a first frequency band, the first antenna array module having a first antenna array surface that is substantially perpendicular to a first boresight and oriented substantially parallel to a first surface of the wireless communication device adjacent to the first antenna array module, utilize the second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module, and transmit an indication of a set of transmission configuration indicator (TCI) states for use in the first frequency band and the second frequency band, the set of TCI states being selected based on the angle.

Aspect 2: The wireless communication device of aspect 1, wherein the first surface and the second surface are a same surface.

Aspect 3: The wireless communication device of aspect 1 or 2, wherein: the set of TCI states is limited based on a link loss expected across the first frequency band and the second frequency band, and the link loss in a given direction relative to the wireless communication device is obtained utilizing a first directional gain of the first antenna array module and a second directional gain of the second antenna array module.

Aspect 4: The wireless communication device of aspect 3, wherein: the first surface and the second surface are a same surface, and the first boresight of the first antenna array module and the second boresight of the second antenna array module are oriented at the angle relative to each other.

Aspect 5: The wireless communication device of any of aspects 1 through 4, wherein the processor and the memory are further configured to: obtain a geometric relationship between the first antenna array module and the second antenna array module, obtain, based on comparative gains associated with the geometric relationship between the first antenna array module and the second antenna array module, a first indication that a quality of service will increase in response to changing transmission and reception operations from: the first antenna array module to the second antenna array module, or the second antenna array module to the first antenna array module; and transmit a recommendation to change the transmission and reception operations between the first antenna array module and the second antenna array module in accordance with a content of the first indication.

Aspect 6: The wireless communication device of aspect 5, wherein the geometric relationship and the comparative gains are obtained from the memory.

Aspect 7: The wireless communication device of any of aspects 1 through 6, wherein the processor and the memory are further configured to: receive an instruction to change transmission and reception operations from: the first antenna array module to the second antenna array module, or the second antenna array module to the first antenna array module; and transmit a recommendation against changing the transmission and reception operations based on obtaining a second indication that a quality of service will decrease in response to carrying out the instruction.

Aspect 8: The wireless communication device of any of aspects 1 through 7, wherein the processor and the memory are further configured to: transmit an indication of a mechanical configuration of the plurality of antenna array modules, including the first antenna array module and the second antenna array module; receive a restricted set of TCI states based on the indication of the mechanical configuration; and select the set of TCI states from the restricted set of TCI states.

Aspect 9: A method at a wireless communication device, comprising: utilizing a first antenna array module to serve a first frequency band, the first antenna array module having a first antenna array surface that is substantially perpendicular to a first boresight and oriented substantially parallel to a first surface of the wireless communication device adjacent to the first antenna array module, utilizing a second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module, and transmitting an indication of a set of transmission configuration indicator (TCI) states for use in the first frequency band and the second frequency band, the set of TCI states being selected based on the angle.

Aspect 10: The method of aspect 9, wherein the first surface and the second surface are a same surface.

Aspect 11: The method of aspect 9 or 10, wherein: the set of TCI states is limited based on a link loss expected across the first frequency band and the second frequency band, and the link loss in a given direction relative to the wireless communication device is obtained utilizing a first directional gain of the first antenna array module and a second directional gain of the second antenna array module.

Aspect 12: The method of aspect 11, wherein: the first surface and the second surface are a same surface; and the first boresight of the first antenna array module and the second boresight of the second antenna array module are oriented at the angle relative to each other.

Aspect 13: The method of any of aspects 9 through 12, further comprising: obtaining a geometric relationship between the first antenna array module and the second antenna array module, obtaining, based on comparative gains associated with the geometric relationship between the first antenna array module and the second antenna array module, a first indication that a quality of service will increase in response to changing transmission and reception operations from: the first antenna array module to the second antenna array module, or the second antenna array module to the first antenna array module; and transmitting a recommendation to change the transmission and reception operations between the first antenna array module and the second antenna array module in accordance with a content of the first indication.

Aspect 14: The method of aspect 13, wherein the geometric relationship and the comparative gains are obtained from a memory of the wireless communication device.

Aspect 15: The method of aspects 9 through 14, further comprising: receiving an instruction to change transmission and reception operations from: the first antenna array module to the second antenna array module, or the second antenna array module to the first antenna array module; and transmitting a recommendation against changing the transmission and reception operations based on obtaining a second indication that a quality of service will decrease in response to carrying out the instruction.

Aspect 16: The method of aspects 9 through 15, further comprising: transmitting an indication of a mechanical configuration of a plurality of antenna array modules, including the first antenna array module and the second antenna array module; receiving a restricted set of TCI states based on the indication of the mechanical configuration; and selecting the set of TCI states from the restricted set of TCI states.

Aspect 17: A wireless communication device, comprising: means for utilizing a first antenna array module to serve a first frequency band, the first antenna array module having a first antenna array surface that is substantially perpendicular to a first boresight and oriented substantially parallel to a first surface of the wireless communication device adjacent to the first antenna array module, means utilizing a second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module, and means for transmitting an indication of a set of transmission configuration indicator (TCI) states for use in the first frequency band and the second frequency band, the set of TCI states being selected based on the angle.

Aspect 18: The wireless communication device of aspect 17, wherein the first surface and the second surface are a same surface.

Aspect 19: The wireless communication device of aspect 17 or 18, wherein: the set of TCI states is limited based on a link loss expected across the first frequency band and the second frequency band, and the link loss in a given direction relative to the wireless communication device is obtained utilizing a first directional gain of the first antenna array module and a second directional gain of the second antenna array module.

Aspect 20: The wireless communication device of aspect 19, wherein: the first surface and the second surface are a same surface; and the first boresight of the first antenna array module and the second boresight of the second antenna array module are oriented at the angle relative to each other.

Aspect 21: The wireless communication device of aspects 17 through 20, further comprising: means for obtaining a geometric relationship between the first antenna array module and the second antenna array module, means for obtaining, based on comparative gains associated with the geometric relationship between the first antenna array module and the second antenna array module, a first indication that a quality of service will increase in response to changing transmission and reception operations from: the first antenna array module to the second antenna array module, or the second antenna array module to the first antenna array module; and means for transmitting a recommendation to change the transmission and reception operations between the first antenna array module and the second antenna array module in accordance with a content of the first indication.

Aspect 22: The wireless communication device of aspect 21, wherein the geometric relationship and the comparative gains are obtained from a memory of the wireless communication device.

Aspect 23: The wireless communication device of aspects 17 through 22, further comprising: means for receiving an instruction to change transmission and reception operations from: the first antenna array module to the second antenna array module, or the second antenna array module to the first antenna array module; and means for transmitting a recommendation against changing the transmission and reception operations based on obtaining a second indication that a quality of service will decrease in response to carrying out the instruction.

Aspect 24: The wireless communication device of aspects 17 through 23, further comprising: means for transmitting an indication of a mechanical configuration of a plurality of antenna array modules, including the first antenna array module and the second antenna array module; means for receiving a restricted set of TCI states based on the indication of the mechanical configuration; and means for selecting the set of TCI states from the restricted set of TCI states.

Aspect 25: A non-transitory computer readable medium storing instructions that when executed by a processing circuit cause the processing circuit to: utilize the first antenna array module to serve a first frequency band, the first antenna array module having a first antenna array surface that is substantially perpendicular to a first boresight and oriented substantially parallel to a first surface of a wireless communication device adjacent to the first antenna array module, utilize the second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module, and transmit an indication of a set of transmission configuration indicator (TCI) states for use in the first frequency band and the second frequency band, the set of TCI states being selected based on the angle.

Aspect 26: The non-transitory computer readable medium of aspect 25, wherein the first surface and the second surface of the wireless communication device are a same surface.

Aspect 27: The non-transitory computer readable medium of aspect 25 or 26, wherein the instructions further cause the processing circuit to: obtain a geometric relationship between the first antenna array module and the second antenna array module, obtain, based on comparative gains associated with the geometric relationship between the first antenna array module and the second antenna array module, a first indication that a quality of service will increase in response to changing transmission and reception operations from: the first antenna array module to the second antenna array module, or the second antenna array module to the first antenna array module; and transmit a recommendation to change the transmission and reception operations between the first antenna array module and the second antenna array module in accordance with a content of the first indication.

Aspect 28: The non-transitory computer readable medium of any of aspects 25 through 27, wherein the instructions further cause the processing circuit to: receive an instruction to change transmission and reception operations from: the first antenna array module to the second antenna array module, or the second antenna array module to the first antenna array module; and transmit a recommendation against changing the transmission and reception operations based on obtaining a second indication that a quality of service will decrease in response to carrying out the instruction.

Aspect 29: The non-transitory computer readable medium of any of aspects 25 through 28, wherein the instructions further cause the processing circuit to: transmit an indication of a mechanical configuration of the plurality of antenna array modules, including the first antenna array module and the second antenna array module; receive a restricted set of TCI states based on the indication of the mechanical configuration; and select the set of TCI states from the restricted set of TCI states.

Aspect 30: The non-transitory computer readable medium of any of aspects 25 through 29, wherein the instructions further cause the processing circuit to: transmit an indication of a mechanical configuration of the plurality of antenna array modules, including the first antenna array module and the second antenna array module; receive a restricted set of TCI states based on the indication of the mechanical configuration; and select the set of TCI states from the restricted set of TCI states.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein. While some examples illustrated herein depict only time and frequency domains, additional domains such as a spatial domain are also contemplated in this disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct A and/or B is intended to cover: A; B; and A and B. The word "obtain" as used herein may mean, for example, acquire, calculate, construct, derive, determine, receive, and/or retrieve. The preceding list is exemplary and not limiting. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A wireless communication device, comprising:
   one or more transceivers;
   a plurality of antenna array modules including a first antenna array module and a second antenna array module, each of the plurality of antenna array modules coupled to at least one of the one or more transceivers;
   a memory; and
   a processor coupled to the one or more transceivers, the plurality of antenna array modules, and the memory, wherein the processor and the memory are configured to:
      utilize the first antenna array module to serve a first frequency band, the first antenna array module having a first antenna array surface that is substantially perpendicular to a first boresight and oriented substantially parallel to a first surface of the wireless communication device adjacent to the first antenna array module,
      utilize the second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module, and
      transmit an indication of a set of transmission configuration indicator (TCI) states for use in the first frequency band and the second frequency band, the set of TCI states being selected based on the angle.

2. The wireless communication device of claim 1, wherein the first surface and the second surface are a same surface.

3. The wireless communication device of claim 1, wherein:
   the set of TCI states is limited based on a link loss expected across the first frequency band and the second frequency band; and
   the link loss in a given direction relative to the wireless communication device is obtained utilizing a first directional gain of the first antenna array module and a second directional gain of the second antenna array module.

4. The wireless communication device of claim 3, wherein:
   the first surface and the second surface are a same surface; and
   the first boresight of the first antenna array module and the second boresight of the second antenna array module are oriented at the angle relative to each other.

5. The wireless communication device of claim 1, wherein the processor and the memory are further configured to:
   obtain a geometric relationship between the first antenna array module and the second antenna array module;
   obtain, based on comparative gains associated with the geometric relationship between the first antenna array module and the second antenna array module, a first indication that a quality of service will increase in response to changing transmission and reception operations from:
      the first antenna array module to the second antenna array module, or
      the second antenna array module to the first antenna array module; and
   transmit a recommendation to change the transmission and reception operations between the first antenna array module and the second antenna array module in accordance with a content of the first indication.

6. The wireless communication device of claim 5, wherein the geometric relationship and the comparative gains are obtained from the memory.

7. The wireless communication device of claim 1, wherein the processor and the memory are further configured to:
   receive an instruction to change transmission and reception operations from:
      the first antenna array module to the second antenna array module, or
      the second antenna array module to the first antenna array module; and
   transmit a recommendation against changing the transmission and reception operations based on obtaining a second indication that a quality of service will decrease in response to carrying out the instruction.

8. The wireless communication device of claim 1, wherein the processor and the memory are further configured to:
    transmit an indication of a mechanical configuration of the plurality of antenna array modules, including the first antenna array module and the second antenna array module;
    receive a restricted set of TCI states based on the indication of the mechanical configuration; and
    select the set of TCI states from the restricted set of TCI states.

9. A method at a wireless communication device, comprising:
    utilizing a first antenna array module to serve a first frequency band, the first antenna array module having a first antenna array surface that is substantially perpendicular to a first boresight and oriented substantially parallel to a first surface of the wireless communication device adjacent to the first antenna array module;
    utilizing a second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module; and
    transmitting an indication of a set of transmission configuration indicator (TCI) states for use in the first frequency band and the second frequency band, the set of TCI states being selected based on the angle.

10. The method of claim 9, wherein the first surface and the second surface are a same surface.

11. The method of claim 9, wherein:
    the set of TCI states is limited based on a link loss expected across the first frequency band and the second frequency band; and
    the link loss in a given direction relative to the wireless communication device is obtained utilizing a first directional gain of the first antenna array module and a second directional gain of the second antenna array module.

12. The method of claim 11, wherein:
    the first surface and the second surface are a same surface; and
    the first boresight of the first antenna array module and the second boresight of the second antenna array module are oriented at the angle relative to each other.

13. The method of claim 9, further comprising:
    obtaining a geometric relationship between the first antenna array module and the second antenna array module;
    obtaining, based on comparative gains associated with the geometric relationship between the first antenna array module and the second antenna array module, a first indication that a quality of service will increase in response to changing transmission and reception operations from:
        the first antenna array module to the second antenna array module, or
        the second antenna array module to the first antenna array module; and
    transmitting a recommendation to change the transmission and reception operations between the first antenna array module and the second antenna array module in accordance with a content of the first indication.

14. The method of claim 13, wherein the geometric relationship and the comparative gains are obtained from a memory of the wireless communication device.

15. The method of claim 9, further comprising:
    receiving an instruction to change transmission and reception operations from:
        the first antenna array module to the second antenna array module, or
        the second antenna array module to the first antenna array module; and
    transmitting a recommendation against changing the transmission and reception operations based on obtaining a second indication that a quality of service will decrease in response to carrying out the instruction.

16. The method of claim 9, further comprising:
    transmitting an indication of a mechanical configuration of a plurality of antenna array modules, including the first antenna array module and the second antenna array module;
    receiving a restricted set of TCI states based on the indication of the mechanical configuration; and
    selecting the set of TCI states from the restricted set of TCI states.

17. A wireless communication device, comprising:
    means for utilizing a first antenna array module to serve a first frequency band, the first antenna array module having a first antenna array surface that is substantially perpendicular to a first boresight and oriented substantially parallel to a first surface of the wireless communication device adjacent to the first antenna array module;
    means utilizing a second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module; and
    means for transmitting an indication of a set of transmission configuration indicator (TCI) states for use in the first frequency band and the second frequency band, the set of TCI states being selected based on the angle.

18. The wireless communication device of claim 17, wherein the first surface and the second surface are a same surface.

19. The wireless communication device of claim 17, wherein:
    the set of TCI states is limited based on a link loss expected across the first frequency band and the second frequency band; and
    the link loss in a given direction relative to the wireless communication device is obtained utilizing a first directional gain of the first antenna array module and a second directional gain of the second antenna array module.

20. The wireless communication device of claim 19, wherein:
    the first surface and the second surface are a same surface; and
    the first boresight of the first antenna array module and the second boresight of the second antenna array module are oriented at the angle relative to each other.

21. The wireless communication device of claim 17, further comprising:
means for obtaining a geometric relationship between the first antenna array module and the second antenna array module;
means for obtaining, based on comparative gains associated with the geometric relationship between the first antenna array module and the second antenna array module, a first indication that a quality of service will increase in response to changing transmission and reception operations from:
the first antenna array module to the second antenna array module, or
the second antenna array module to the first antenna array module; and
means for transmitting a recommendation to change the transmission and reception operations between the first antenna array module and the second antenna array module in accordance with a content of the first indication.

22. The wireless communication device of claim 21, wherein the geometric relationship and the comparative gains are obtained from a memory of the wireless communication device.

23. The wireless communication device of claim 17, further comprising:
means for receiving an instruction to change transmission and reception operations from:
the first antenna array module to the second antenna array module, or
the second antenna array module to the first antenna array module; and
means for transmitting a recommendation against changing the transmission and reception operations based on obtaining a second indication that a quality of service will decrease in response to carrying out the instruction.

24. The wireless communication device of claim 17, further comprising:
means for transmitting an indication of a mechanical configuration of a plurality of antenna array modules, including the first antenna array module and the second antenna array module;
means for receiving a restricted set of TCI states based on the indication of the mechanical configuration; and
means for selecting the set of TCI states from the restricted set of TCI states.

25. A non-transitory computer readable medium storing instructions that when executed by a processing circuit cause the processing circuit to:
utilize a first antenna array module to serve a first frequency band, the first antenna array module having a first antenna array surface that is substantially perpendicular to a first boresight and oriented substantially parallel to a first surface of a wireless communication device adjacent to the first antenna array module,
utilize a second antenna array module to serve a second frequency band, the first antenna array module being different from the second antenna array module and the first frequency band being different from the second frequency band, the second antenna array module having a second antenna array surface that is substantially perpendicular to a second boresight and oriented at an angle relative to a second surface of the wireless communication device adjacent to the second antenna array module, and
transmit an indication of a set of transmission configuration indicator (TCI) states for use in the first frequency band and the second frequency band, the set of TCI states being selected based on the angle.

26. The non-transitory computer readable medium of claim 25, wherein the first surface and the second surface of the wireless communication device are a same surface.

27. The non-transitory computer readable medium of claim 25, wherein the instructions further cause the processing circuit to:
obtain a geometric relationship between the first antenna array module and the second antenna array module;
obtain, based on comparative gains associated with the geometric relationship between the first antenna array module and the second antenna array module, a first indication that a quality of service will increase in response to changing transmission and reception operations from:
the first antenna array module to the second antenna array module, or
the second antenna array module to the first antenna array module; and
transmit a recommendation to change the transmission and reception operations between the first antenna array module and the second antenna array module in accordance with a content of the first indication.

28. The non-transitory computer readable medium of claim 25, wherein the instructions further cause the processing circuit to:
receive an instruction to change transmission and reception operations from:
the first antenna array module to the second antenna array module, or
the second antenna array module to the first antenna array module; and
transmit a recommendation against changing the transmission and reception operations based on obtaining a second indication that a quality of service will decrease in response to carrying out the instruction.

29. The non-transitory computer readable medium of claim 25, wherein the instructions further cause the processing circuit to:
transmit an indication of a mechanical configuration of a plurality of antenna array modules, including the first antenna array module and the second antenna array module;
receive a restricted set of TCI states based on the indication of the mechanical configuration; and
select the set of TCI states from the restricted set of TCI states.

30. The non-transitory computer readable medium of claim 25, wherein the instructions further cause the processing circuit to:
transmit an indication of a mechanical configuration of a plurality of antenna array modules, including the first antenna array module and the second antenna array module;
receive a restricted set of TCI states based on the indication of the mechanical configuration; and
select the set of TCI states from the restricted set of TCI states.

\* \* \* \* \*